US012580635B2

(12) United States Patent　(10) Patent No.: US 12,580,635 B2
Hahn et al.　(45) Date of Patent: Mar. 17, 2026

(54) REPEATER-BASED BEAM CONTROL METHOD AND DEVICE IN COMMUNICATION SYSTEM

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gene Back Hahn, Hwaseong-si (KR); Young Kil Suh, Hwaseong-si (KR); Ui Hyun Hong, Hwaseong-si (KR); Bum Jun Kim, Seoul (KR); Jeonghyeon Kwon, Seoul (KR); Wan Choi, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/752,401

(22) Filed: Jun. 24, 2024

(65) Prior Publication Data

US 2024/0348322 A1　Oct. 17, 2024

Related U.S. Application Data

(63) Continuation-in-part of application No. PCT/KR2023/000761, filed on Jan. 16, 2023.

(30) Foreign Application Priority Data

Jan. 14, 2022 (KR) ........................ 10-2022-0005748

(51) Int. Cl.
H04B 7/155 (2006.01)
H04B 7/0408 (2017.01)
(Continued)

(52) U.S. Cl.
CPC ........... H04B 7/155 (2013.01); H04B 7/0408 (2013.01); H04B 7/043 (2013.01); H04B 7/0682 (2013.01)

(58) Field of Classification Search
CPC .... H04W 88/04; H04W 40/22; H04B 7/2606; H04B 7/155; H04B 7/04013;
(Continued)

(56) References Cited

U.S. PATENT DOCUMENTS 8,983,556 B2 * 3/2015 Takano .............. H04B 7/15557
455/574
10,530,460 B2 * 1/2020 Takano ................. H04W 16/26
(Continued)

FOREIGN PATENT DOCUMENTS

KR 10-2015-012933 A 11/2015
WO 2021/037151 A1 3/2021

OTHER PUBLICATIONS

International Search Report dated May 4, 2023 cited in International Patent Application No. PCT/KR2022/000761 (w/ English translation).

*Primary Examiner* — Sophia Vlahos
(74) *Attorney, Agent, or Firm* — Morgan Lewis & Bockius LLP

(57) ABSTRACT

An operation method of a first communication node in a communication system may include the steps of: transmitting, to a second communication node, a first indication including information about one or more repeaters; transmitting a first signal group corresponding to the one or more repeaters to the second communication node through the one or more repeaters; receiving, from the second communication node, a first response including a measurement result for the first signal group; determining a first repeater from among the one or more repeaters on the basis of the first response; determining beam combination information for
(Continued)

one or more beam combinations between the first communication node, the first repeater, and the second communication node; and performing wireless communication with the first repeater and the second communication node.

20 Claims, 9 Drawing Sheets

(51) Int. Cl.
    *H04B 7/0426*       (2017.01)
    *H04B 7/06*         (2006.01)

(58) Field of Classification Search
    CPC ........... H04B 7/15507; H04B 7/15542; H04B
               7/15528; H04B 7/145; H04B 7/15; H04B
               7/15592; H04B 7/0408; H04B 7/043;
                                 H04B 7/0682
    See application file for complete search history.

(56) References Cited

U.S. PATENT DOCUMENTS

| | | | |
|---|---|---|---|
| 12,150,031 B2 * | 11/2024 | Elshafie | H04W 40/12 |
| 2008/0056199 A1 * | 3/2008 | Park | H04W 72/542 |
| | | | 370/332 |
| 2011/0110261 A1 * | 5/2011 | Frenger | H04B 7/15542 |
| | | | 370/252 |
| 2016/0285539 A1 * | 9/2016 | Sadiq | H04W 8/005 |
| 2018/0139682 A1 * | 5/2018 | Xu | H04W 40/22 |
| 2019/0320361 A1 * | 10/2019 | Uchiyama | H04W 36/033 |
| 2020/0359434 A1 | 11/2020 | Raghavan et al. | |
| 2021/0112479 A1 | 4/2021 | Abedini et al. | |
| 2021/0126694 A1 * | 4/2021 | Abedini | H04B 7/0408 |
| 2021/0135734 A1 | 5/2021 | Abedini et al. | |
| 2022/0078693 A1 * | 3/2022 | Ly | H04W 36/38 |
| 2022/0272602 A1 * | 8/2022 | Huang | H04W 48/20 |
| 2023/0362881 A1 * | 11/2023 | Wu | H04W 40/22 |
| 2025/0007569 A1 * | 1/2025 | Chi | H04B 7/0456 |

* cited by examiner

100

200

300 user plane and control plane

400 user plane

450 control plane

500

502

505

501

REPEATER-BASED BEAM CONTROL METHOD AND DEVICE IN COMMUNICATION SYSTEM

CROSS-REFERENCE TO RELATED APPLICATION

The present application is a continuation-in-part of currently pending International Patent Application No. PCT/KR2023/000761, filed Jan. 16, 2023, which claims priority to Korean Patent Application Number 10-2022-0005748 filed Jan. 14, 2022, the entire contents of which are incorporated herein for all purposes by these references.

BACKGROUND OF THE PRESENT DISCLOSURE

Field of the Present Disclosure

The present disclosure relates to a repeater-based beam control technique in a communication system, and more particularly, to a beam control technique for improving beam transmission and reception performance based on a repeater relaying wireless signals between communication nodes.

Description of Related Art

With the development of information and communication technology, various wireless communication technologies are being developed. Representative wireless communication technologies include long-term evolution (LTE) and new radio (NR) defined as the 3rd generation partnership project (3GPP) standards. The LTE may be one of the 4th generation (4G) wireless communication technologies, and the NR may be one of the 5th generation (5G) wireless communication technologies.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above.

In a relatively high frequency band such as a 24-53 GHz band corresponding to the FR2 band, an unlicensed band, and a millimeter wave band, a path loss may occur at a relatively high level. In an exemplary embodiment of a communication system using a high frequency band, the path loss problem may be solved by using a large number of antennas to transmit and receive a wireless signal (or beam) with high antenna gain.

In an exemplary embodiment of a communication system, beam-based communication between a transmitting end and a receiving end may or may not be relayed by a repeater. The beam-based communication relayed by a repeater may be configured in a different manner than beam-based communication not relayed by a repeater. Techniques for improving the performance of beam-based communication relayed by a repeater are required.

Matters described as the prior arts are prepared to promote understanding of the background of the present disclosure, and may include matters that are not already known to those of ordinary skill in the technology domain to which exemplary embodiments of the present disclosure belong.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present disclosure are directed to providing a method and apparatus for controlling beams to improve performance of beam transmission and reception based on a repeater relaying wireless signals between communication nodes.

An operation method of a first communication node for achieving the above-described objective may include: transmitting, to a second communication node, a first indication including information on one or more repeaters; transmitting, to the second communication node and through the one or more repeaters, a first signal group including one or more first signals respectively corresponding to the one or more repeaters; receiving, from the second communication node, a first response including a measurement result for each of the one or more first signals included in the first signal group; in response to the first response, determining a first repeater to use for communication with the second communication node among the one or more repeaters; determining beam combination information for one or more beam combinations between the first communication node, the first repeater, and the second communication node; and in response to the beam combination information, performing wireless communication with the first repeater and the second communication node.

The first indication may include at least one of information on one or more indexes corresponding to the one or more repeaters, or information on one or more transmission beams of the first communication node corresponding to the one or more repeaters.

The measurement results included in the first response may include information on one or more reception strength values for the one or more first signals received by the second communication node through the one or more repeaters, and the determining of the first repeater may include: identifying a best first reception strength value among the one or more reception strength values; and determining the first repeater corresponding to the first reception strength value to use for communication with the second communication node.

The operation method may further include: after determining the first repeater, performing a search signaling procedure for searching for information on one or more phase shift configurations of the first repeater, wherein the performing of the search signaling procedure may include: transmitting, to the first repeater, a first change indicator indicating to change a phase shift configuration; transmitting a second signal to the first repeater; receiving, from the first repeater, a second response for the second signal transmitted from the second communication node; and determining whether an additional search is required for information on phase shift configurations, wherein the second response may include information on a result of receiving the second signal at the second communication node, the second signal being phase-shifted by the first repeater based on one of the one or more phase shift configurations.

The operation method may further include: after performing the search signaling procedure, when the additional search is determined to be required, re-performing the search signaling procedure.

The operation method may further include: after performing the search signaling procedure, when the additional search is determined not be required, transmitting a first search stop indicator to the first repeater indicating that the search signaling procedure is stopped.

The beam combination information may be determined through a combination of at least part of information on one or more transmission beams of the first communication node, information on one or more phase shift configurations of the first repeater, information on one or more reception beams of the second communication node, or information on one or more beam combination indexes.

The performing of the wireless communication may include: transmitting the beam combination information to the second communication node through the first repeater; transmitting, to the second communication node through the first repeater, one or more beams corresponding to each of the one or more beam combinations; receiving, from the second communication node, information on a measurement result for each of the one or more beams; and based on the measurement results for the one or more beams, determining a priority of each of the one or more beam combinations.

The performing of the wireless communication may further include: after determining the priority, selecting at least one beam combination among the one or more beam combinations based on the determined priorities; and receiving, from the second communication node, a beam combination reselection indicator indicating whether a beam combination reselection procedure for reselecting at least one beam combination is required, wherein when the beam combination reselection indicator indicates that a beam combination reselection procedure is required, the beam combination reselection procedure is triggered.

The performing of the wireless communication may include: receiving, from the second communication node, a repeater reselection indicator indicating whether a repeater reselection procedure for reselecting a repeater to use for communication with the second communication node is required, wherein when the repeater reselection indicator indicates that a repeater reselection procedure is required, the repeater reselection procedure is triggered.

An operation method of a first communication node for achieving the above-described objective may include: receiving, from a second communication node, a first indication including information on one or more repeaters; receiving, from the second communication node and through the one or more repeaters, a first signal group including one or more first signals respectively corresponding to the one or more repeaters; transmitting, to the second communication node, a first response including a measurement result for each of the one or more first signals included in the first signal group; receiving, from the second communication node, beam combination information on one or more beam combinations between the first communication node, the first repeater, and the second communication node; and in response to the beam combination information, performing wireless communication with the first repeater and the second communication node, wherein the first repeater is a repeater that the second communication node determines to use for communication between the first and second communication nodes among the one or more repeaters based on the first response.

The measurement results included in the first response may include information on one or more reception strength values for the one or more first signals received by the second communication node through the one or more repeaters, and the first repeater may correspond to a first reception strength value which is a best reception strength value among the one or more reception strength values.

The operation method may further include: after transmitting the first response, performing a search signaling procedure for searching for information on one or more phase shift configurations of the first repeater, wherein the performing of the search signaling procedure may include: receiving a second signal from the first repeater, the second signal being transmitted from the second communication node and phase-shifted by the first repeater based one of the one or more phase shift configurations; and transmitting, to the second communication node and through the first repeater, a second response including information on a reception result of the phase-shifted second signal.

The beam combination information may be determined through a combination of at least part of information on one or more transmission beams of the second communication node, information on one or more phase shift configurations of the first repeater, information on one or more reception beams of the first communication node, or information on one or more beam combination indexes.

The performing of the wireless communication may include: receiving, from the second communication node through the first repeater, one or more beams corresponding to each of the one or more beam combinations; and transmitting, to the second communication node, information on a measurement result for each of the one or more beams, wherein a priority of each of the one or more beam combinations may be determined based on the measurement results for the one or more beams, and at least one beam combination may be selected from among the one or more beam combinations based on the priorities.

The performing of the wireless communication may include: after transmitting the information on a measurement result for each of the one or more beams, transmitting, to the second communication node, a beam combination reselection indicator indicating whether a beam combination reselection procedure for reselecting at least one beam combination is required, wherein when the beam combination reselection indicator indicates that a beam combination reselection procedure is required, the beam combination reselection procedure may be triggered.

The performing of the wireless communication may include: transmitting, to the second communication node, a repeater reselection indicator indicating whether a repeater reselection procedure for reselecting a repeater to use for communication between the first and second communication nodes is required, wherein when the repeater reselection indicator indicates that a repeater reselection procedure is required, the repeater reselection procedure may be triggered.

A first communication node for achieving the above-described objective may include: a processor, and the processor may cause the first communication node to perform: transmitting, to a second communication node, a first indication including information on one or more repeaters; transmitting, to the second communication node and through the one or more repeaters, a first signal group including one or more first signals respectively corresponding to the one or more repeaters; receiving, from the second communication node, a first response including a measurement result for each of the one or more first signals included in the first signal group; in response to the first response, determining a first repeater to use for communication with the second communication node among the one or more repeaters; determining beam combination information for one or more beam combinations between the first communication node, the first repeater, and the second communication node; and in response to the beam combination information, performing wireless communication with the first repeater and the second communication node.

The processor may further cause the first communication node to perform: after determining the first repeater, performing a search signaling procedure for searching for information on one or more phase shift configurations of the first repeater, wherein the performing of the search signaling procedure includes: transmitting, to the first repeater, a first change indicator indicating to change a phase shift configuration; transmitting a second signal to the first repeater; receiving, from the first repeater, a second response for the second signal transmitted from the second communication node; and determining whether an additional search is required for information on phase shift configurations, wherein the second response may include information on a result of receiving the second signal at the second communication node, the second signal being phase-shifted by the first repeater based on one of the one or more phase shift configurations.

In the performing of the wireless communication, the processor may further cause the first communication node to perform: transmitting the beam combination information to the second communication node through the first repeater; transmitting, to the second communication node through the first repeater, one or more beams corresponding to each of the one or more beam combinations; receiving, from the second communication node, information on a measurement result for each of the one or more beams; and based on the measurement results for the one or more beams, determining a priority of each of the one or more beam combinations.

According to exemplary embodiments of a repeater-based beam control method and apparatus in a communication system, the most suitable repeater for relaying communication between specific communication nodes can be easily selected from among one or more repeaters existing in the communication system. Information on one or more phase shift configurations of the selected repeater can be easily identified based on signaling procedures between the communication nodes. Based on this information, one or more beam combinations can be determined using information on beams of each communication node and the phase shift configurations of the selected repeater. The beam combination(s) identified as the best among the determined beam combinations can then be utilized for repeater-based communication. Consequently, the performance of repeater-based beam transmission and reception can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
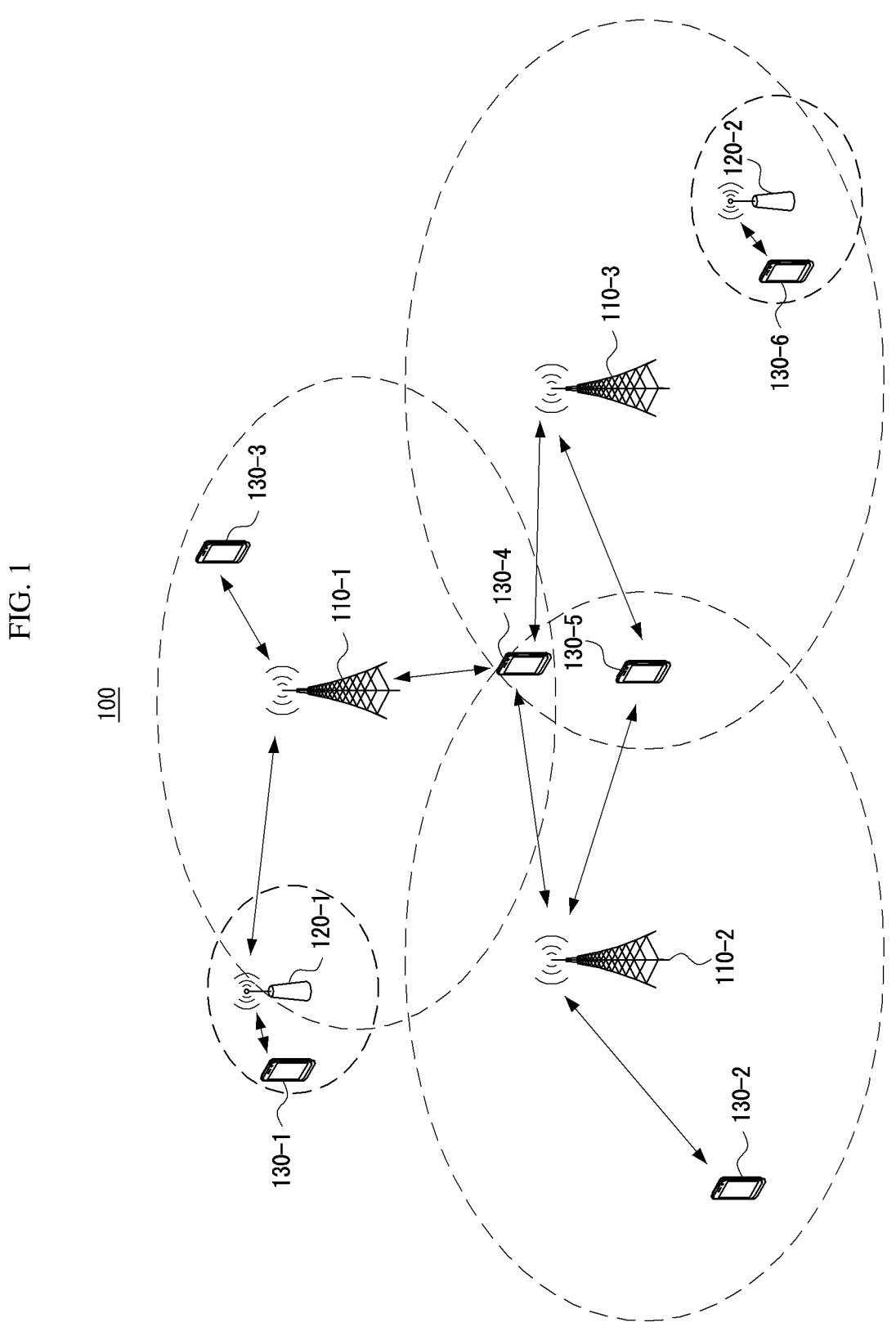
FIG. 1 is a conceptual diagram illustrating an exemplary embodiment of a communication system.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the contrary, the invention(s) is/are intended to cover not only the exemplary embodiments of the present disclosure, but also various alternatives, modifications, equivalents and other embodiments, which may be included within the spirit and scope of the invention as defined by the appended claims.

Exemplary embodiments of the present disclosure are disclosed herein.

However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a Global System for Mobile communication (GSM) or a Code Division Multiple Access (CDMA), 3G mobile communication network such as a Wideband Code Division Multiple Access (WCDMA) or a CDMA2000, 3.5G mobile communication network such as a High Speed Downlink Packet Access (HSDPA) or a High Speed Uplink Packet Access (HSUPA), 4G mobile communication network such as a Long Term Evolution (LTE) network or an LTE-Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multi-hop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

As shown in FIG. 1, a communication system 100 may include a plurality of communication nodes 110-1, 110-2, 110-3, 120-1, 120-2, 130-1, 130-2, 130-3, 130-4, 130-5, and 130-6. Also, the communication system 100 may further include a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110-1, 110-2, 110-3, 120-1, 120-2, 130-1, 130-2, 130-3, 130-4, 130-5, and 130-6 may support communication protocols defined in the 3rd generation partnership project (3GPP) technical specifications (e.g., LTE communication protocol, LTE-A communication protocol, NR communication protocol, or the like). The plurality of communication nodes 110-1, 110-2, 110-3, 120-1, 120-2, 130-1, 130-2, 130-3, 130-4, 130-5, and 130-6 may support Code Division Multiple Access (CDMA) based communication protocol, Wideband CDMA (WCDMA) based communication protocol, Time Division Multiple Access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
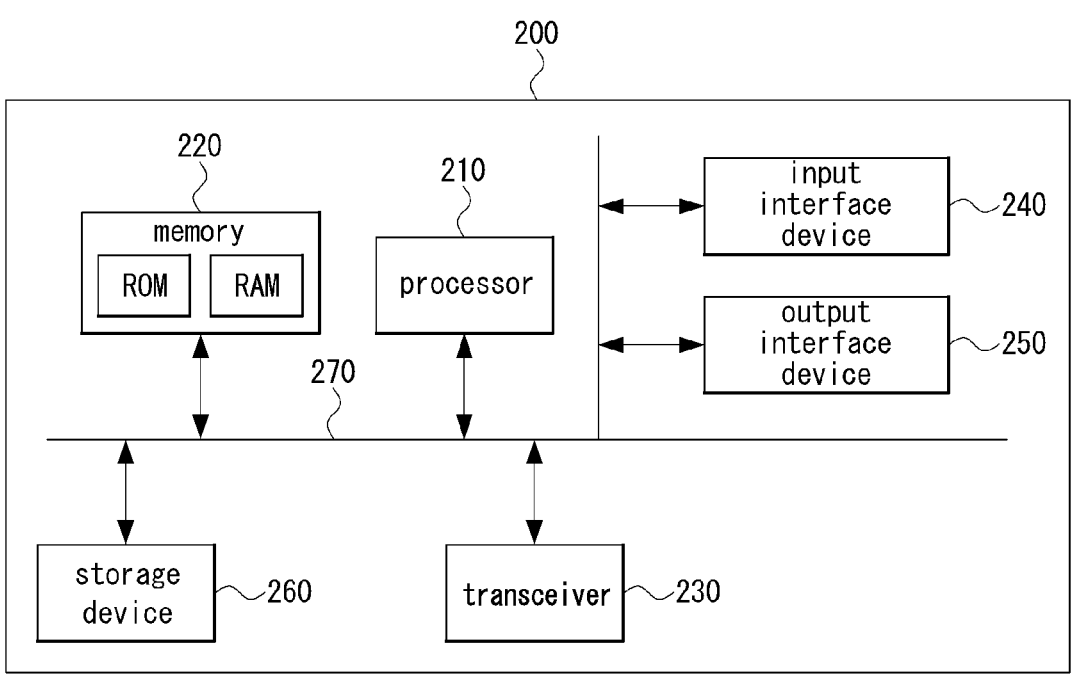
FIG. 2 is a block diagram illustrating an exemplary embodiment of a communication node constituting a communication system.

FIG. 2 is a block diagram illustrating an exemplary embodiment of a communication node constituting a communication system.

As shown in FIG. 2, an apparatus 200 may include at least one processor 210, a memory 220, and a transceiver 230 connected to the network for performing communications. Also, the apparatus 200 may further include an input interface device 240, an output interface device 250, a storage device 260, and the like. The respective components included in the apparatus 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may include at least one of read-only memory (ROM) and random access memory (RAM).

Referring again to FIG. 1, the communication system 100 may include a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g. single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to operations of the plurality of base stations 110-1, 110-2, 110-3, 120-1, and 120-2, operations supported by the plurality of base stations 110-1, 110-2, 110-3, 120-1, and 120-2, or the like. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for controlling beams and methods for transmitting and receiving signals for beam control in a communication system will be described. Even when a method (e.g. transmission or reception of a data packet) performed at a first communication node among communication nodes is described, the corresponding second communication node may perform a method (e.g. reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3:
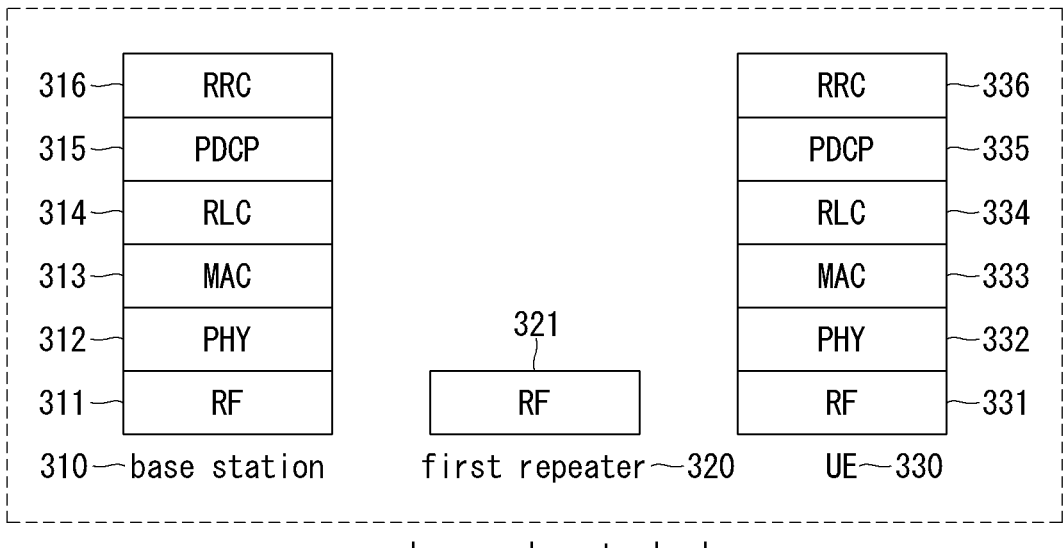
FIG. 3 is a conceptual diagram for describing various exemplary embodiments of a user plane and a control plane in a communication system including a wireless repeater.

FIG. 3 is a conceptual diagram for describing a first exemplary embodiment of a user plane and a control plane in a communication system including a wireless repeater.

As shown in FIG. 3, the communication system may include one or more communication nodes. For example, the communication system may include one or more base stations and one or more terminals. The communication system may include one or more wireless repeaters that relay wireless communications between the one or more communication nodes.

In a wireless connection section between communication nodes, a radio interface protocol or radio interface protocol stack structure 300 may be defined. For example, the radio interface protocol may be divided into a physical layer, data link layer, and network layer which are configured vertically.

The radio interface protocol may be divided into a user plane and a control plane. Here, the control plane may be a plane for transmitting control signals. The control signal may be referred to as a signaling signal. The user plane may be a plane for transmitting user data.

In an exemplary embodiment of the communication system, the communication system may include a base station 310 and a terminal 330. For example, the base station 310 may correspond to an eNB, gNB, or the like. The terminal 330 may also be referred to as a user equipment (UE). The communication system may include a first repeater 320 that relays wireless communication between the base station 310 and the terminal 330. The first repeater 320 may correspond to a radio frequency (RF) repeater. Each of the base station 310, first repeater 320, and terminal 330 of the communication system may be configured identically or similarly to the communication nodes 110-1, 110-2, 110-3, 120-1, 120-2, 130-1, 130-2, 130-3, 130-4, 130-5, and 130-6 described with reference to FIG. 1 or may be configured identically or similarly to the communication node 200 described with reference to FIG. 2.

In the user plane of the radio interface protocol stack structure 300 of the communication system, each of the base station 310 and the terminal 330 may include a PHY layer 312 or 332 included in a layer 1 (L1), and a MAC layer 313 or 333, a radio link control (RLC) layer 314 or 334, and a packet data convergence protocol (PDCP) layer 315 or 335 included in a layer 2 (L2), and the like. On the other hand, in the control plane of the protocol stack structure 300, each of the base station 310 and the terminal 330 may include a PHY layer 312 or 332 included in a L1, a MAC layer 313 or 333, an RLC layer 314 or 334, and a PDCP layer 315 or 335 included in a L2, a radio resource control (RRC) layer 316 or 336 included in a layer 3 (L3), and the like. The base station 310 and the terminal 330 may transmit and receive wireless signals through RF functions 311 and 331.

Meanwhile, in the user plane and control plane of the protocol stack structure 300, the first repeater 320 may not include layers such as PHY to RRC layers, but may receive and amplify signals transmitted from the base station 310 and the terminal 330, and transmit or retransmit the amplified signals based on an RF function 321. In other words, in the user plane and control plane of the protocol stack structure 300, layers such as PHY to RRC layers of the first repeater 320 may be transparent, and wireless signals received at the first repeater 320 may be amplified, transmitted, and/or retransmitted in terms of the RF function 321.

In exemplary embodiments of a wireless repeater such as the first repeater 320 described with reference to FIG. 3, the wireless repeater may repeatedly perform reception, amplification, transmission, and/or retransmission operations for RF signals simply based on the RF function. In the instant case, the implementation complexity and cost of the wireless repeater and the communication system including the wireless repeater may be lowered.

Figure 4A:
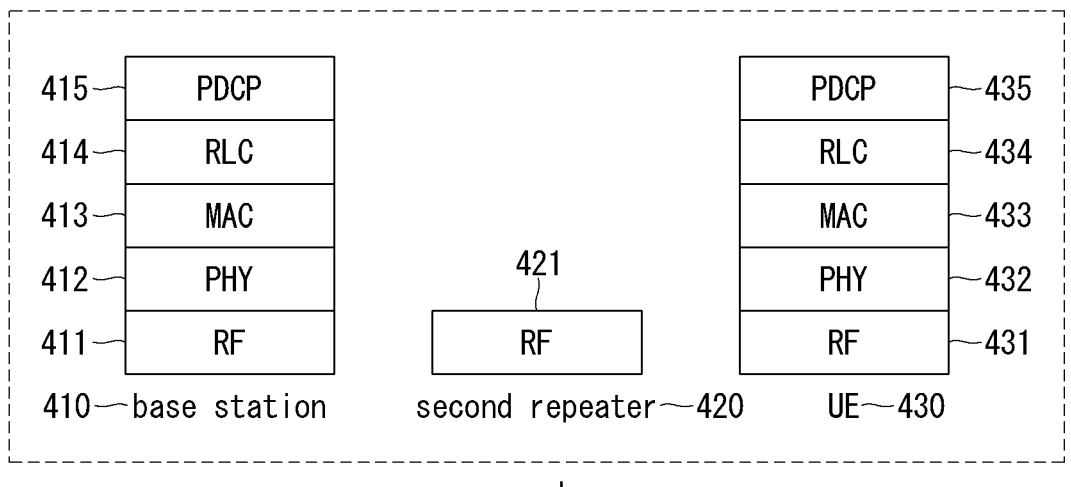
FIG. 4A and FIG. 4B are conceptual diagrams for describing various exemplary embodiments of a user plane and a control plane in a communication system including a wireless repeater.
Figure 4B:
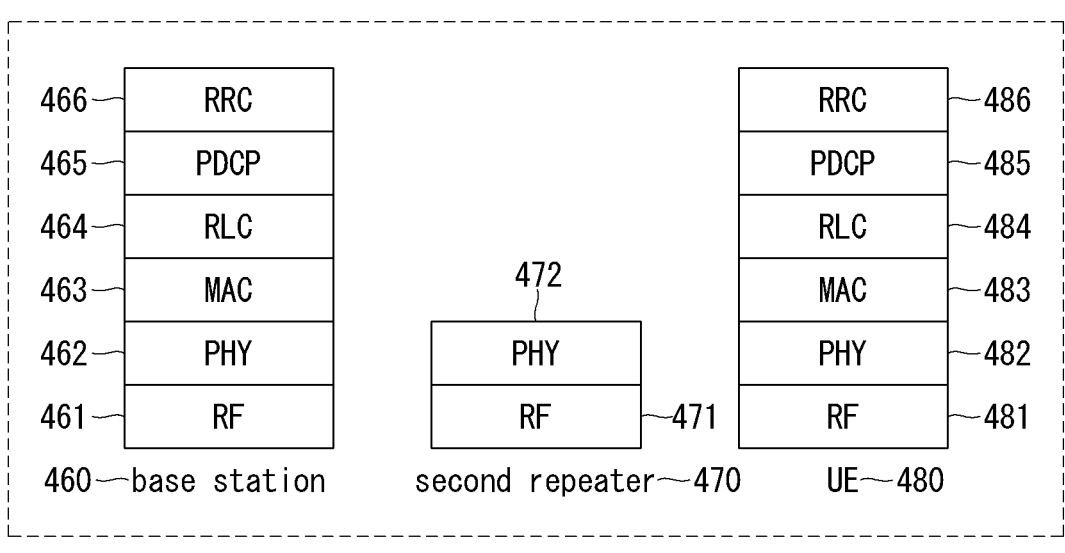

FIGS. 4A and 4B are conceptual diagrams for describing a second exemplary embodiment of a user plane and a control plane in a communication system including a wireless repeater.

As shown in FIGS. 4A and 4B, radio interface protocols or radio interface protocol stack structures 400 and 450 may be defined in a wireless connection section between communication nodes. The radio interface protocol may be divided into a user plane and a control plane. Hereinafter, in describing the second exemplary embodiment of the user plane and control plane in the communication system with reference to FIGS. 4A and 4B, description that is redundant with those described with reference to FIGS. 1 to 3 may be omitted.

In an exemplary embodiment of the communication system, the communication system may include base stations 410 and 460 and terminals 430 and 480. The communication system may include second repeaters 420 and 470 that relay wireless communication between the base stations 410 and 460 and the terminals 430 and 480. Each of the base stations 410 and 460, the second repeaters 420 and 470, and the terminals 430 and 480 of the communication system may be configured identically or similarly to the communication nodes 110-1, 110-2, 110-3, 120-1, 120-2, 130-1, 130-2, 130-3, 130-4, 130-5, and 130-6 described with reference to FIG. 1 or may be configured identically or similarly to the communication node 200 described with reference to FIG. 2. The second repeater 420 may also be referred to as an 'advanced repeater'.

As shown in FIG. 4A, in the user plane 400 of the radio interface protocol stack structure of the communication system, each of the base station 410 and the terminal 430 may include a PHY layer 412 or 432, a MAC layer 413 or 433, an RLC layer 414 or 434, a PDCP layer 415 or 435, and the like. According to an exemplary embodiment of the communication system, in the user plane 400 of the radio interface protocol stack structure of the communication system, each of the base station 410 and the terminal 430 may further include an RRC layer. The base station 410 and the terminal 430 may transmit and receive wireless signals through RF functions 411 and 431. In the user plane 400 of the protocol stack structure, the second repeater 420 may not include layers such as PHY to PDCP layers, but may receive and amplify signals transmitted from the base station 410 and the terminal 430, and transmit or retransmit the amplified signals based on an RF function 421. In the user plane 400 of the protocol stack structure, layers such as PHY to PDCP layers of the second repeater 420 may be transparent, and wireless signals received at the second repeater 420 may be amplified, transmitted, and/or retransmitted in terms of the RF function 421.

Meanwhile, as shown in FIG. 4B, in the control plane 450 of the protocol stack structure, each of the base station 460 and the terminal 480 may include a PHY layer 462 or 482, a MAC layer 463 or 483, an RLC layer 464 or 484, a PDCP layer 465 or 485, and an RRC layer 466 or 486. The base station 460 and the terminal 480 may transmit and receive wireless signals through RF functions 461 and 481. In the control plane 450 of the protocol stack structure, the second repeater 470 may further include a PHY layer 472 in addition to an RF function 471. The PHY layer 472 of the second repeater 470, which is an advanced repeater, may be used for management operations of the base station 460 for the second repeater 470. For example, the PHY layer 472 of the second repeater 470 may process information for a capability report of the second repeater 470, or information for the base station 460 to manage and indicate beam(s) of the second repeater 470, and the like.

Figure 5:
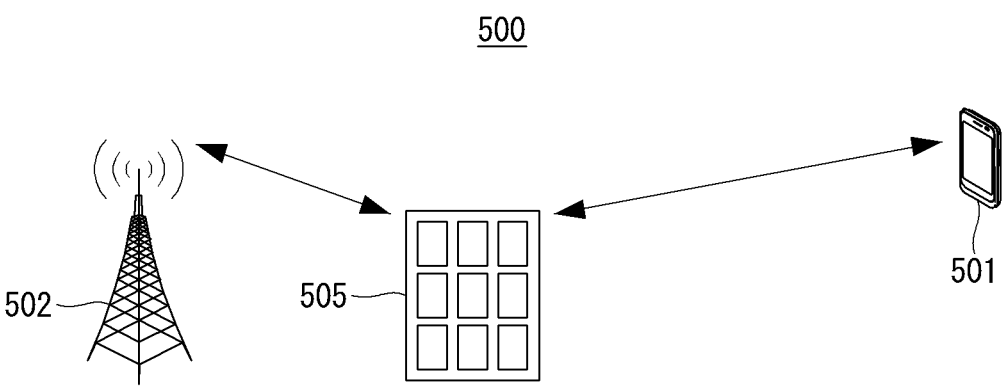
FIG. 5 is a conceptual diagram for describing an exemplary embodiment of a communication system including a wireless repeater.

FIG. 5 is a conceptual diagram for describing an exemplary embodiment of a communication system including a wireless repeater.

As shown in FIG. 5, a communication system 500 may support repeater-based communication. The communication system 500 may include one or more wireless repeaters. Th one or more wireless repeaters may relay wireless communications between one or more communication nodes. For example, the one or more wireless repeaters may relay wireless communications between one or more upper nodes (base stations, etc.) and one or more lower nodes (terminals, etc.). Alternatively, the one or more wireless repeaters may relay wireless communications between one or more terminals, or wireless communications between one or more network entities. FIG. 5 shows an exemplary embodiment in which one wireless repeater included in the communication system 500 relays wireless communication between two communication nodes. However, this is merely an example for convenience of description, and exemplary embodiments of the communication system are not limited thereto. Hereinafter, in describing an exemplary embodiment of the communication system including a wireless repeater with reference to FIG. 5, description that is redundant with those described with reference to FIGS. 1 to 4B may be omitted.

The communication system 500 may include a first communication node 501, a second communication node 502, a wireless repeater 505, and the like. The wireless repeater 505 may be configured identically or similarly to the first repeater 320 described with reference to FIG. 3 or the second repeater 420 or 470 described with reference to FIGS. 4A and 4B. The wireless repeater 505 may be an active repeater or a passive repeater. The wireless repeater 505 may be an intelligent reflective surface (IRS) type repeater. However, this is merely an example for convenience of description, and exemplary embodiments of the communication system including wireless repeater(s) are not limited thereto.

In an exemplary embodiment of the communication system 500, the first communication node 501 may be configured identically or similarly to the terminal 330 described with reference to FIG. 3 or the terminal 430 or 480 described with reference to FIGS. 4A and 4B. The second communication node 502 may be configured identically or similarly to the base station 310 described with reference to FIG. 3 or the base station 410 or 460 described with reference to FIGS. 4A and 4B. However, this is merely an example for convenience of description, and exemplary embodiments of the communication system including wireless repeater(s) are not limited thereto.

In an exemplary embodiment of the communication system 500, the first communication node 501 may correspond to a receiving node and the second communication node 502 may correspond to a transmitting node. The second communication node 502 may transmit a wireless signal to the first communication node 501. Here, the wireless signal transmitted by the second communication node 502 may directly reach the first communication node 501. Alternatively, the wireless signal transmitted by the second communication node 502 may reach the first communication node 501 by being relayed by the wireless repeater 505.

On the other hand, in an exemplary embodiment of the communication system 500, the first communication node 501 may correspond to a transmitting node, and the second communication node 502 may correspond to a receiving node. The first communication node 501 may transmit a wireless signal to the second communication node 502. Here, the wireless signal transmitted by the first communication node 501 may directly reach the second communication node 502. Alternatively, the wireless signal transmitted by the first communication node 501 may reach the second communication node 502 by being relayed by the wires repeater 505.

The wireless repeater 505 may shift a phase of the wireless signal being relayed. In other words, the wireless signal relayed by the wireless repeater 505 may have a different (i.e. shifted) phase from a phase of the wireless signal before being relayed. The wireless repeater 505 may have one or more phase shift configurations (PSCs) for shifting the phase of the wireless signal it relays. Here, each of the one or more PSCs may mean a phase shift matrix (PSM). However, this is merely an example for convenience of description, and exemplary embodiments of the communication system including wireless repeater(s) are not limited thereto. For example, each of the one or more PSCs may mean a phase shift vector or a phase shift value. On the other hand, the wireless repeater 505 may not shift the phase of the wireless signal it relays. In the instant case, the wireless repeater 505 may be regarded as not having a phase shift configuration. Alternatively, the wireless repeater 505 may be regarded as having a 'phase shift configuration that prevents the phase from being shifted'.

The wireless repeater 505 may correspond to an active repeater or a passive repeater. The active repeater may independently perform a beam management process for beamforming in communication between the first communication node 501 and the second communication node 502. Here, the beam management process may include an initial beam establishment procedure that selects a slightly wider beam through a combination of a synchronization signal block (SSB) temporal index and a random access channel (RACH) occasion, a beam adjustment procedure that selects a more detailed beam combination, a beam recovery procedure that selects a new beam when performance is degraded due to beam misalignment, and the like. When an intermediate device (or relay device) such as the repeater exists between a transmitting end and a receiving end, such the beam management process may be performed individually between the transmitting end and the intermediate device, and between the intermediate device and the receiving end. On the other hand, the passive repeater may not be able to independently perform such the beam management process in communication between the first communication node 501 and the second communication node 502. In addition, the passive repeater may not be able to actively determine its own PSC(s) or actively transmit information on its PSC(s) to other communication nodes.

In an exemplary embodiment of the communication system, beam-based communications between the transmitting end and the receiving end may or may not be relayed by a repeater. The beam-based communication relayed by a repeater may be configured in a different manner than the beam-based communication not relayed by a repeater. Techniques for improving the performance of beam-based communication relayed by a repeater are required.

Figure 6:
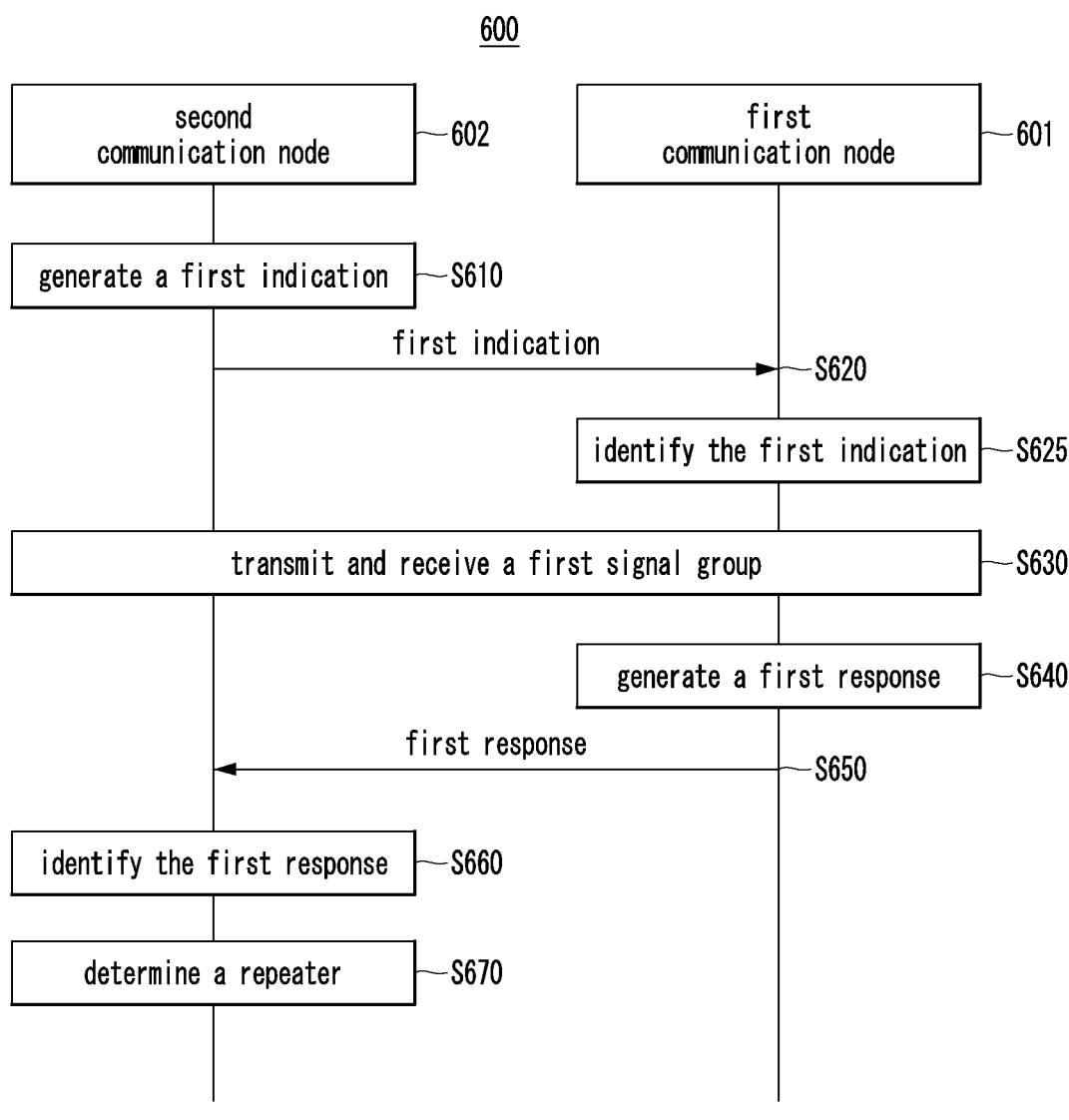
FIG. 6 is a sequence hart for describing various exemplary embodiments of a signal transmission and reception method in a communication system.

FIG. 6 is a sequence hart for describing a first exemplary embodiment of a signal transmission and reception method in a communication system.

As shown in FIG. 6, a communication system 600 may support repeater-based communication. The communication system 600 may include one or more repeaters.

The one or more repeaters may relay wireless communications between one or more communication nodes. Each of the one or more repeaters may be configured identically or similarly to the wireless repeater 500 described with reference to FIG. 5. FIG. 6 shows an exemplary embodiment in which one or more repeaters included in the communication system 600 relay wireless communications between two communication nodes. However, this is merely an example for convenience of description, and exemplary embodiments of the communication system are not limited thereto. In the first exemplary embodiment of the signal transmission and reception method in the communication system, operations for selecting a repeater may be performed.

Hereinafter, in describing the first exemplary embodiment of the signal transmission and reception method in the communication system with reference to FIG. 6, description that is redundant with those described with reference to FIGS. 1 to 5 may be omitted.

In an exemplary embodiment of the communication system 600, a first communication node 601 may correspond to a receiving node and a second communication node 602 may correspond to a transmitting node. The second communication node 602 may transmit a wireless signal to the first communication node 601. Here, the wireless signal transmitted by the second communication node 602 may directly reach the first communication node 601. Alternatively, the wireless signal transmitted by the second communication node 602 may reach the first communication node 601 by being relayed by one or more wireless repeaters. The second communication node 602, which is the transmitting node, may generate and transmit indication information (hereinafter referred to as 'first indication') for communication with the first communication node 601 or communication with one or more receiving nodes including the first communication node 601 using the one or more wireless repeaters.

In an exemplary embodiment of the communication system 600, the second communication node 602 may correspond to a base station, and the first communication node 601 may correspond to a terminal. The second communication node 602 may generate and transmit indication information (hereinafter referred to as 'first indication') for communication with the first communication node 601 or communication with one or more terminals including the first communication node 601 using the one or more wireless repeaters.

According to the first exemplary embodiment of the signal transmission and reception method in the communication system, the second communication node 602 may generate the first indication (S610). Here, the first indication may include indication information for repeater-based wireless communication. For example, the first indication may include at least some of information shown in Table 1.

TABLE 1

| Repeater | Transmission beam of second communication node | Repeater index |
|----------|------------------------------------------------|----------------|
| Repeater #1 | Beam #2-1 | 00 |
| Repeater #2 | Beam #2-2 | 01 |

TABLE 1-continued

| Repeater | Transmission beam of second communication node | Repeater index |
|----------|------------------------------------------------|----------------|
| Repeater #3 | Beam #2-3 | 10 |
| Repeater #4 | Beam #2-4 | 11 |

The first indication may be defined to include information on one or more repeaters that the second communication node 602 is aware of. Alternatively, the first indication may be defined to include information on one or more repeaters that the second communication node 602 is able to use for communication with the first communication node 601. The first indication may include one or more repeater indexes respectively mapped to the one or more repeaters. The first indication may include information on one or more transmission beams (e.g. beams #2-1 to #2-4) of the second communication node 602 respectively corresponding to the one or more repeaters.

The second communication node 602 may transmit the first indication to the first communication node 601 (S620). The first indication may be transmitted to the first communication node 601 as being included in RRC signaling, system information (e.g. SIB, MIB, etc.), or other types of signals transmitted from the second communication node 602. The first communication node 601 may receive the first indication transmitted from the second communication node 602 (S620). In an exemplary embodiment of the communication system 600, the first indication transmitted and received in step S620 may include information for an initial establishment procedure for beam-based communication or beam-based communication using a repeater. The first communication node 601 may identify the information included in the received first indication (S625).

When the second communication node 602 corresponds to a network entity such as a base station (BS) and the first communication node 601 corresponds to a terminal, one or more transmission beams (i.e. BS beams) of the second communication node, which are included in the first indication, may correspond to information of one or more SSBs. In the instant case, the first indication may further include information on indexes of SSBs (e.g. 0, 1, 2, 3, etc.). In the initial beam establishment procedure, the second communication node 602 may transmit one or more SSBs through one or more transmission beams. The second communication node 602 may receive information on reception strength (e.g. RSRP) values measured for the one or more SSBs from the first communication node 601. Here, the reception strength values may correspond to reference signal received power (RSRP) values. The second communication node 602 may compare the reception strength values received from the first communication node 601, and determine which of the one or more repeaters to use to perform communication with the first communication node 601. However, this is merely an example for convenience of description, and the first exemplary embodiment of the signal transmission and reception method in the communication system is not limited thereto.

For example, in an exemplary embodiment of the communication system 600, the information on the one or more transmission beams of the second communication node in the first indication may correspond to information on one or more first signals used for the initial beam establishment procedure. In the instant case, the first indication may further include information on indexes of the first signals (e.g. 0, 1, 2, 3, etc.). For example, the first indication may include at least some of information shown in Table 2 expanded from Table 1.

TABLE 2

| Repeater | Transmission beam of second communication node | First signal (index) | Repeater index |
|---|---|---|---|
| Repeater #1 | Beam #2-1 | Signal #1-1 (0) | 00 |
| Repeater #2 | Beam #2-2 | Signal #1-2 (1) | 01 |
| Repeater #3 | Beam #2-3 | Signal #1-3 (2) | 10 |
| Repeater #4 | Beam #2-4 | Signal #1-4 (3) | 11 |

The first indication described with reference to Table 1 or Table 2 may be transmitted through a physical broadcast channel (PBCH) demodulation reference signal (DMRS), PBCH payload, or the like. Tables 1 and 2 show a situation where a total of four repeaters are available for the second communication node to communicate with the first communication node. When the second communication node has a total of n repeaters available for communication with the first communication node, $\log_2(n)$ bits may be assigned for the repeater index. The second communication node may additionally transmit a repeater index value indicating each repeater to the first communication node through RRC signaling such as RRC reconfiguration.

In Tables 1 and 2, each of the transmission beams (beam #2-1, beam #2-2, beam #2-3, beam #2-4) of the second communication node may correspond to a beam determined according to a direction of the corresponding repeater (i.e. a wide beam directed toward the corresponding repeater). In Tables 1 and 2, the transmission beams of the second communication node may each correspond to wide beams, such as beams generated in the initial beam establishment procedure of the beam management process.

In the initial beam establishment procedure, the second communication node 602 may transmit one or more first signals (or a first signal group including the first signals) through one or more transmission beams. The second communication node 602 may receive information on reception strength values measured for the one or more first signals from the first communication node 601. The second communication node 602 may compare the reception strength values received from the first communication node 601 and determine which of the one or more repeaters to use to perform communication with the first communication node 601.

In an exemplary embodiment of the communication system 600, the first communication node 601 and the second communication node 602 may perform operations of transmitting and receiving the first signal group for the initial beam establishment procedure (S630) after the transmission and reception operation of the first indication in step S620. The first signal group may include one or more signals (i.e. first signals) for the initial beam establishment procedure. The first signals included in the first signal group may be respectively transmitted to the first communication node 601 through the corresponding repeaters. The first communication node 601 may receive the one or more first signals through the one or more repeaters.

The first communication node 601 may generate a first response based on measurement results for the one or more first signals received in step S630 (S640). For example, the first response may include at least some of information shown in Table 3.

TABLE 3

| Repeater (index) | First signal (index) | Reception strength |
|---|---|---|
| Repeater #1 (00) | Signal #1-1 (0) | RSRP_69 |
| Repeater #2 (01) | Signal #1-2 (1) | RSRP_100 |
| Repeater #3 (10) | Signal #1-3 (2) | RSRP_88 |
| Repeater #4 (11) | Signal #1-4 (3) | RSRP_95 |

Table 3 shows an exemplary embodiment in which the reception strength values are RSRP values. However, this is merely an example for convenience of description, and the first exemplary embodiment of the signal transmission and reception method in the communication system is not limited thereto. The first response may indicate the reception strength corresponding to each of the one or more first signals (e.g. beams #2-1 to #2-4). Alternatively, the first response may indicate the reception strength for each repeater corresponding to each of one or more received signals.

The first communication node 601 may transmit the generated first response to the second communication node 602 (S650). The second communication node 602 may receive the first response (S650). The second communication node 602 may identify the information of the received first response (S660). The second communication node 602 may determine a repeater to use for communication with the first communication node 601 based on the information of the first response identified in step S660 (S670). For example, when the first response is configured as shown in Table 3, the second communication node 602 may identify the signal #1-2 corresponding to the largest reception strength value (RSRP_100). Alternatively, the second communication node 602 may identify the repeater #2 that relays the signal #1-2 corresponding to the largest reception strength value (RSRP_100). The second communication node 602 may determine or select the repeater #2 as the repeater to be used for communication with the first communication node 601. The second communication node 602 may transmit information on the repeater (hereinafter referred to as 'first repeater') determined in step S670 to the first communication node, thereby explicitly indicating to the first communication node 601 that the first repeater is selected. Alternatively, the second communication node 602 may then implicitly indicate to the first communication node 601 that the first repeater is selected by transmitting a wireless signal to the first communication node 601 through the first repeater. Alternatively, the first communication node 601 may, without explicit or implicit indication from the second communication node 602, estimate the repeater (i.e. the first repeater) to be selected in step S670 base on the information of the first response it transmitted in step S650.

In the first exemplary embodiment of the signal transmission and reception method in the communication system, the second communication node 602 may correspond to a base station, and the first communication node 601 may correspond to a terminal. The base station may obtain information on a reception strength for each repeater from the terminal. The base station may select a repeater corresponding to the largest reception strength value. The base station may determine that the selected repeater is the optimal repeater to use for communication with the terminal, and may identify an optimal beam combination through a beam adjustment procedure for the selected repeater. In FIG. 6, the base station may transmit, to the terminal, information on repeater indexes, indication information for measurement and reporting of a reception strength of a reference signal, and/or the like through RRC signaling such as UEInformationRequest and RRCReconfiguration (or, SIB or newly defined signaling). The terminal may perform measurement and reporting operations based on the information received from the base station. The terminal may transmit related information to the base station through RRC signaling such as UEInformationResponse or RRCReconfigurationComplete (or measurement report, UE Assistance Information, Msg1, MsgA, or newly defined signaling, etc.).

The base station may transmit the first signals to the terminal through SSBs. Alternatively, the base station may transmit the first signals to the terminal through CSI-RSs. In the instant case, the terminal may transmit information on the repeater indexes to the base station through uplink control information (UCI), and transmit information on reception strengths of the first signals to the base station through a CSI-RS reporting process.

Figure 7:
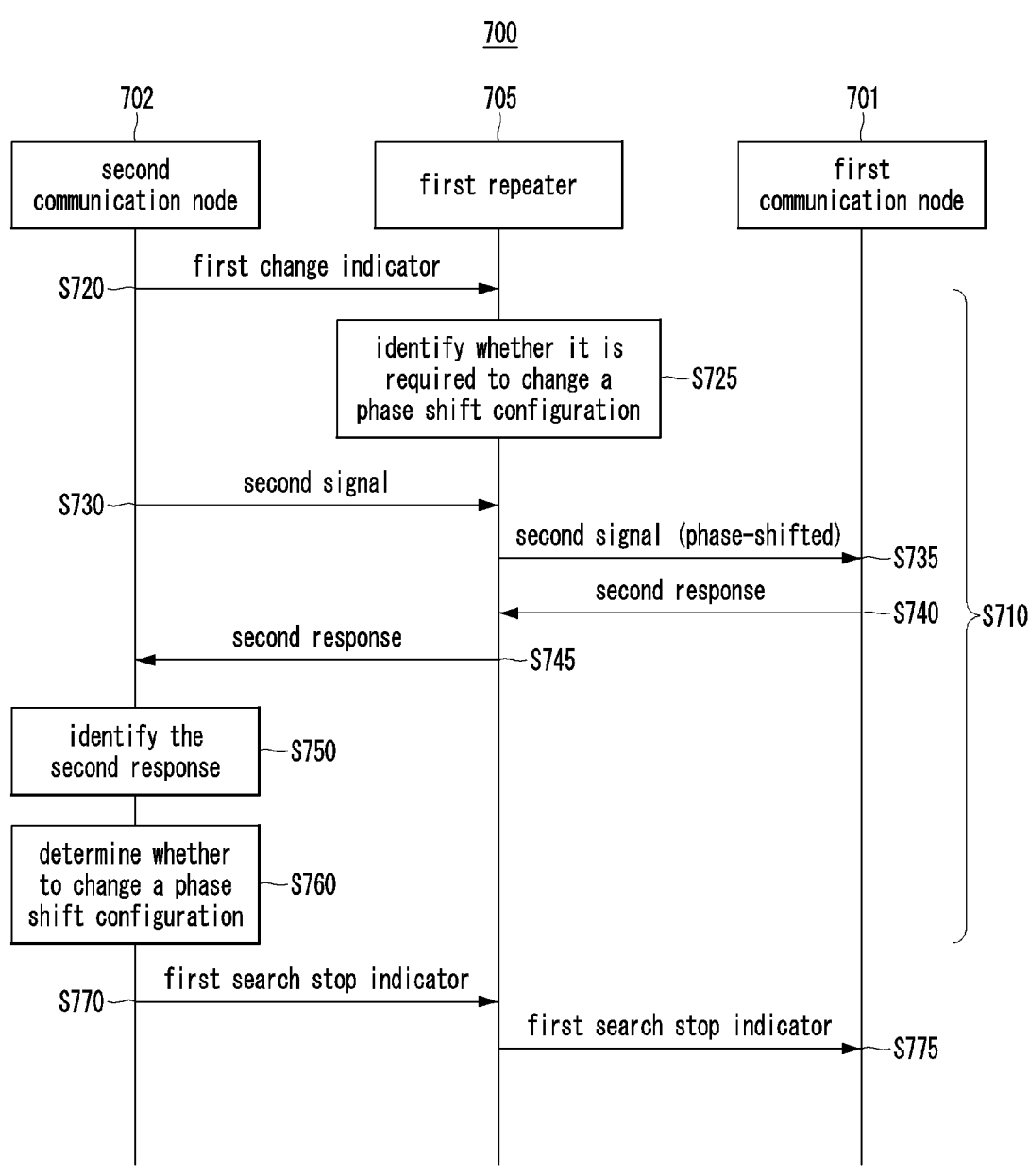
FIG. 7 is a flowchart for describing various exemplary embodiments of a signal transmission and reception method in a communication system.

FIG. 7 is a flowchart for describing a second exemplary embodiment of a signal transmission and reception method in a communication system.

As shown in FIG. 7, a communication system 700 may support repeater-based communication. The communication system 700 may be configured identically or similarly to the communication system 600 described with reference to FIG. 6. In the second exemplary embodiment of the signal transmission and reception method in the communication system, operations of searching for phase shift configurations (PSCs) may be performed. Hereinafter, in describing the second exemplary embodiment of the signal transmission and reception method in the communication system with reference to FIG. 7, description that is redundant with those described with reference to FIGS. 1 to 6 may be omitted.

The communication system 700 may include a first communication node 701 and a second communication node 702. The communication system 700 may further include one or more repeaters, including at least a first repeater 705. The first communication node 701 may be configured identically or similarly to the first communication node 601 described with reference to FIG. 6. The second communication node 702 may be configured identically or similarly to the second communication node 602 described with reference to FIG. 6. Each of the one or more repeaters may be the same as or similar to the one or more repeaters described with reference to FIG. 6. The one or more repeaters may have one or more PSCs. The first repeater 705 may be the same as or similar to the repeater selected in step S670 (i.e. repeater to be used for communication between the first communication node and the second communication node) described with reference to FIG. 6. The first communication node 701 and the second communication node 702 may perform operations similar to those described with reference to FIG. 6. Through this, the first repeater 705 that is to relay the wireless communication between the first communication node 701 and the second communication node 702 may be determined.

The first repeater 705 may have one or more PSCs. When the first repeater 705 is a passive repeater, it may not be easy for the first repeater 705 to independently perform operations such as selecting one of the one or more PSCs or changing the selected PSC. In addition, it may not be easy for the first repeater 705 to independently transmit information on the selected or changed PSC(s) to the second communication node 702 or the first communication node 701. In order to improve a communication quality between the first communication node 701 and the second communication node 702, a procedure for the second communication node 702 to search for or determine PSCs of the first repeater 705 (or one or more repeaters) may be required.

The second communication node 702 may perform, with the first communication node 701 and the first repeater 705, a signaling procedure for identifying and determining an optimal PSC in communication with the first communication node 701 based on relaying of the first repeater 705. The second communication node 702 may perform a signaling procedure (S710) multiple times to identify a reception result while changing or switching the PSC of the first repeater 705, and identify the number of PSCs of the first repeater 705 through the signaling procedure. The signaling procedure according to step S710 may be referred to as a 'PSC search procedure' or 'search procedure'.

For the search procedure according to step S710, a change indicator may be defined for the second communication node 702 to indicate to the first repeater 705 whether to change the PSC. The change indicator may be referred to as a 'PSC change indicator'. In an exemplary embodiment of the communication system 700, the change indicator may be configured identically or similarly to Table 4.

TABLE 4

| Change indicator | Indication information |
|---|---|
| 0 | It is required to change the phase shift configuration |
| 1 | It is not required to change the phase shift configuration |

Table 4 is merely an example for convenience of description, and exemplary embodiments of the communication system are not limited thereto. For example, in another exemplary embodiment of the communication system, the change indicator set to 1 may mean that a procedure for changing the PSC is required, and the change indicator set to 0 may mean that a procedure for changing the PSC is not required. The change indicator may be transmitted through, for example, downlink control information (DCI), or may be transmitted through RRC signaling such as RRCReconfiguration. Alternatively, new RRC signaling may be defined for transmission of the change indicator. For example, the change indicator may indicate whether to change the PSC (or whether it is required to change the PSC) in the following manner.

"Enumerated {True, False}, Enumerated {Needed, Not Needed}"

The second communication node 702 may transmit a first change indicator to the first repeater (S720). Through step S720, the search procedure according to step S710 may be triggered. The first change indicator transmitted in step S720 may indicate that the PSC of the first repeater 705 needs to be changed. The first repeater 705 may receive the first change indicator from the second communication node 702 (S720). The first repeater 705 may identify that the PSC needs to be changed based on the first change indicator received in step S720 (S725). The first repeater 705 may then apply a changed PSC when relaying a signal received from the second communication node 702 to the first communication node 701.

The second communication node 702 may transmit a second signal to the first repeater 705 (S730). The first repeater 705 may transmit the second signal transmitted from the second communication node 702 to the first communication node 701 (S735). In step S735, the second signal transmitted from the first repeater 705 to the first communication node 701 may be a signal phase-shifted (or a signal to a specific PSC is applied) by the first repeater 705 based on the specific PSC.

The first communication node 701 may receive the phase-shifted second signal from the first repeater (S735). The first communication node 701 may generate a second response based on a measurement result of the second signal received in step S735. Specifically, the second response may include information on a reception strength of the second signal. Here, the reception strength of the second signal may correspond to an RSRP value for the second signal. However, this is merely an example for convenience of description, and the second exemplary embodiment of the signal transmission and reception method in the communication system is not limited thereto.

The first communication node 701 may transmit the generated second response to the second communication node 702. Specifically, the first communication node 701 may transmit the generated second response to the first repeater 705 (S740). The first repeater 705 may receive the second response from the first communication node 701 (S740). The first repeater 705 may transmit the second response received in step S740 to the second communication node 702 (S745). The second communication node 702 may receive the second response (S745).

The second communication node 702 may identify the information of the received second response (S750). The second communication node 702 may determine whether to change the PSC based on the information of the second response identified in step S770 (S760). The search procedure according to step S710 may be regarded as including at least some of the operations according to steps S720 to S760.

In step S760, the second communication node 702 may determine whether it is required to additionally perform the search procedure according to step S710 based on the reception strength values identified through the second response up to that time point. If it is determined that an additional search procedure according to step S710 is required, the second communication node 702 may perform the operations according to steps S720 to S760 again. In other words, if it is determined that an additional search procedure according to step S710 is required, the second communication node 702 may re-perform the transmission operation of the first change indicator according to step S720 to trigger the search procedure according to step S710.

In step S760, the second communication node may determine whether it is required to additionally perform the search procedure according to step S710 based on the reception strength values identified through the second response up to that time point. Here, the reception strength values identified through the second response up to that time point may be configured as shown in Table 5, for example.

TABLE 5

| Phase shift configuration | Reception strength value |
|---|---|
| PSC #1 | RSRP_69 |
| PSC #2 | RSRP_87 |
| PSC #3 | RSRP_52 |
| PSC #1 | RSRP_68 |
| PSC #2 | RSRP_90 |
| PSC #3 | RSRP_55 |
| PSC #1 | RSRP_69 |
| PSC #2 | RSRP_88 |
| PSC #3 | RSRP_54 |

Table 5 shows a situation where the reception strength values are RSRP values and a total of three PSCs (PSC #1, PSC #2, PSC #3) of the first repeater 705 exist. However, this is merely an example for convenience of description, and the second exemplary embodiment of the signal transmission and reception method in the communication system is not limited thereto. As shown in Table 5, if the first repeater 705 receives the first change indicator from the second communication node 702 when the PSC #1 is configured, the first repeater 705 may change the PSC thereof to PSC #2. If the first repeater 705 receives the first change indicator from the second communication node 702 when the PSC #2 is configured, the first repeater 705 may change the PSC thereof to PSC #3. If the first repeater 705 receives the first change indicator from the second communication node 702 which the PSC #3 is configured, the first repeater 705 may change the PSC thereof to PSC #1. Alternatively, the first change indicator may further include information (e.g. an index corresponding to a PSC #C) indicating a change to a specific PSC (hereinafter, PSC #C), and the first repeater 705 may change the PSC thereof to the PSC #C based on a PSC index included in the first change indicator. In the instant case, the change indicator may be expanded identically or similarly to Table 6.

TABLE 6

| Change indicator (indication information) | Phase shift configuration (index) |
|---|---|
| 0 (It is required to change the phase shift configuration) | PSC #C (XX) |
| 1 (It is not required to change the phase shift configuration) | — |

As described above, the search procedure according to step S710 may be performed based on the change of the PSC according to the first change indicator. Through this, the second communication node 702 may easily determine the number of PSCs of the first repeater 705. In addition, such the operations may be used in identifying transmission beams of the second communication node 702, PSC(s) of the first repeater 705, and a combination of reception beams of the first communication node 701 in a beam adjustment procedure to be performed in the future. In addition, such the operations may also be used in other cases where it is required to change the PSC of the first repeater 705. For example, when the second communication node 702 determines that the PSC of the first repeater 705 needs to be changed, the second communication node 702 may transmit a change indicator indicating that the PSC needs to be changed (e.g. first change indicator) to the first repeater 705. On the other hand, when the second communication node 702 determines that the PSC of the first repeater 705 does not need to be changed, the second communication node 702 may transmit a change indicator indicating that the PSC does not need to be changed (e.g. second change indicator) to the first repeater 705. Thereafter, the first communication node 701, the second communication node 702, and the first repeater 705 may perform operations such as CSI reporting, and continue to perform communications with each other.

In the second exemplary embodiment of the signal transmission and reception method in the communication system, the second communication node 702 may correspond to a base station, and the first communication node 701 may correspond to a terminal. The base station may transmit a second signal (e.g. reference signal) to the terminal through the selected first repeater. The terminal may report information on a reception strength measured for the received second signal to the base station. After receiving the information on the reception strength, the base station may repeat the same identification process for the next PSC of the repeater by setting the change indicator to 1. RRCReconfigurationComplete, Measurement Report, UE Assistance Information, or new RRC signaling may be used in the terminal's reception strength reporting process. Alternatively, the terminal's reception strength reporting may be performed through a CSI-RS reporting process. The base station may determine the number of PSCs of the repeater based on a periodicity of the reception strength. Table 5 shows a situation in which the base station determines that the number of PSCs of the first repeater is three. This operation may be used in the same or similar manner when measuring the performance with respect to transmission beams of all base stations, PSCs of the repeater, and combination of reception beams of the terminal in the later beam adjustment procedure.

Meanwhile, the second communication node 702 may transmit a search stop indicator based on whether it is required to additionally perform the search procedure according to step S710. The search stop indicator may be referred to as a 'PSC search stop indicator'. The search stop indicator may be defined identically or similarly to Table 7.

TABLE 7

| Search stop indicator | Indication information |
| --- | --- |
| 0 | Stop the search procedure for phase shift configurations |
| 1 | Do not stop the search procedure for phase shift configurations |

Table 7 is merely an example for convenience of description, and exemplary embodiments of the communication system are not limited thereto. For example, in another exemplary embodiment of the communication system, the search stop indicator set to 0 may mean that the search process for PSCs is stopped, and the search stop indicator set to 1 may mean that the search process for PSCs is not stopped. The search stop indicator may be transmitted through, for example, downlink control information (DCI), or may be transmitted through RRC signaling such as RRCReconfiguration. Alternatively, new RRC signaling may be defined for transmission of the search stop indicator. For example, the search stop indicator may indicate whether to stop the search process for PSCs in the following manner.

"Enumerated {True, False}, Enumerated {Needed, Not Needed}"

In an exemplary embodiment of the communication system, if it is determined that the search procedure according to step S710 does not need to be performed additionally, the second communication node 702 may transmit a first search stop indicator to the first repeater 705 (S770). Here, the first search stop indicator may indicate that the search process for PSCs is stopped. The first repeater 705 may transmit the first search stop indicator received in step S770 to the first communication node 701 (S775). In the instant case, the search procedure according to step S710 may no longer be performed.

On the other hand, if it is determined that the search procedure according to step S710 needs to be performed additionally, the second communication node 702 may transmit a second search stop indicator to the first repeater 705. Here, the second search stop indicator may indicate that the search process for PSCs is not stopped. In the instant case, the second communication node 702 may perform the operations according to steps S720 to S760 again.

With reference to FIG. 7, the exemplary embodiment in which the change indicator and the search stop indicator correspond to distinct types of information or signals has been described as an example. However, this is merely an example for convenience of description, and the second exemplary embodiment of the signal transmission and reception method in the communication system is not limited to the exemplary embodiment of FIG. 7. For example, the change indicator and the search stop indicator may be collectively referred to as a type of indicator related to the search signaling procedure (e.g. 'search procedure indicator'). Alternatively, the change indicator and the search stop indicator may be regarded as a result of being named with different names depending on a time point at which one type of indicator related to the search signaling procedure is transmitted. Alternatively, the change indicator and the search stop indicator may be regarded as a result of one type of indicator related to the search signaling procedure being implemented in a different manner as needed.

Meanwhile, when the second communication node 702 has or knows information on the PSCs of the first repeater 705, the search procedure according to step S710 may not be performed. Alternatively, when the first repeater 705 is capable of providing information on the PSCs to the second communication node 702, the second communication node 7020 may receive the information on the PSCs from the first repeater 705 instead of performing the search procedure according to step S710.

Figure 8:
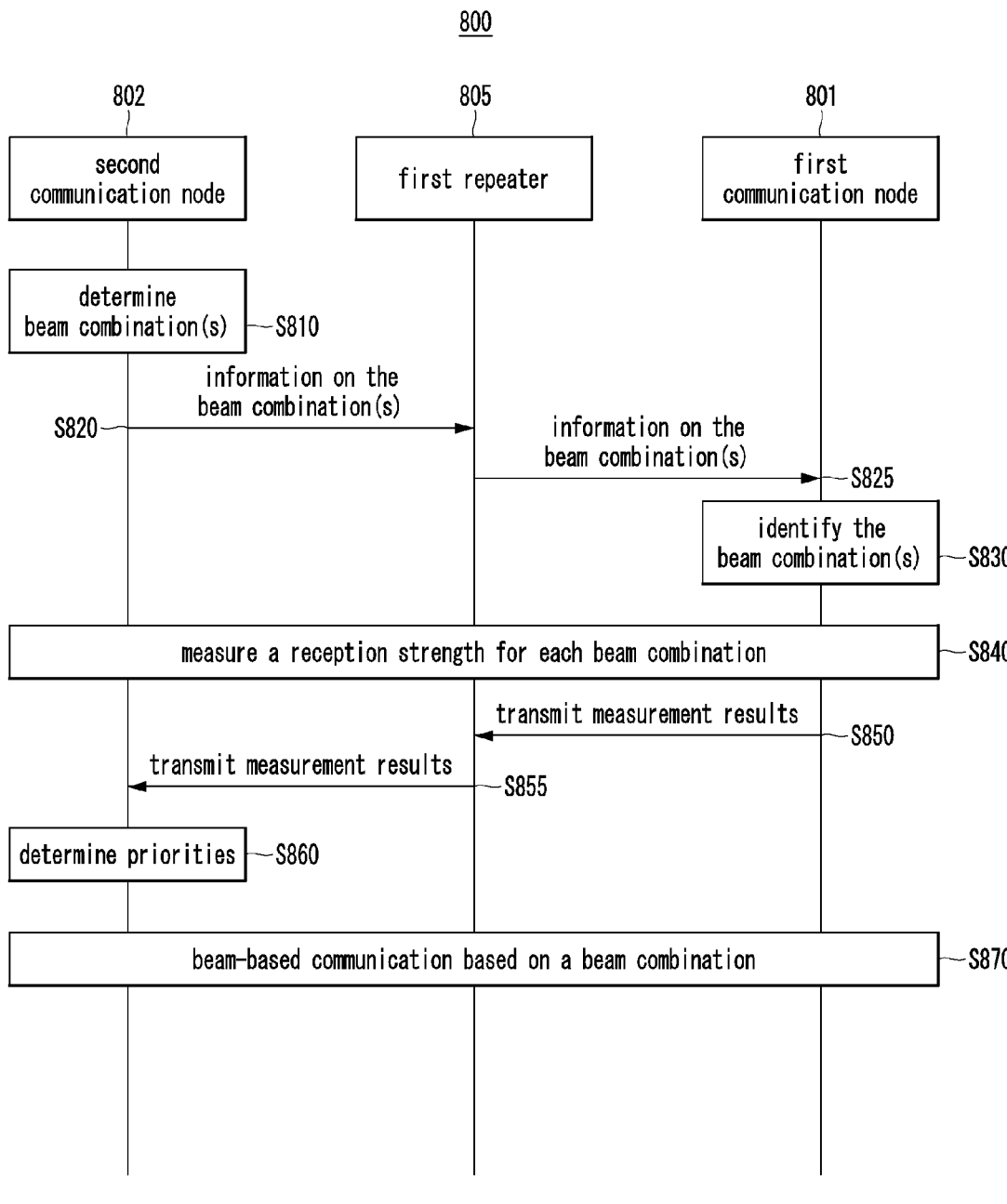
FIG. 8 is a flowchart for describing various exemplary embodiments of a signal transmission and reception method in a communication system.

FIG. 8 is a flowchart for describing a third exemplary embodiment of a signal transmission and reception method in a communication system.

As shown in FIG. 8, a communication system 800 may support repeater-based communication. The communication system 800 may be configured identically or similarly to the communication system 600 described with reference to FIG. 6. In the third exemplary embodiment of the signal transmission and reception method in the communication system, operations for a beam adjustment procedure through selection of a beam combination may be performed. Hereinafter, in describing the third exemplary embodiment of the signal transmission and reception method in the communication system with reference to FIG. 8, description that is redundant with those described with reference to FIGS. 1 to 7 may be omitted.

The communication system 800 may include a first communication node 801 and a second communication node 802. The communication system 800 may further include one or more repeaters, including at least a first repeater 805. The first communication node 801 may be configured identically or similarly to the first communication node 601 described with reference to FIG. 6. The second communication node 802 may be configured identically or similarly to the second communication node 602 described with reference to FIG. 6. The one or more repeaters may be the same as or similar to the one or more repeaters described with reference to FIG. 6. Each of the one or more repeaters may have one or more PSCs. The first repeater 805 may be the same as or similar to the repeater selected in step S670 (i.e. repeater to be used for communication between the first communication node and the second communication node) described with reference to FIG. 6. The first communication node 801 and the second communication node 802 may perform operations similar to those described with reference to FIG. 6. Through this, the first repeater 805 that is to relay wireless communication between the first communication node 801 and the second communication node 802 may be determined.

The second communication node 802 may identify information on PSCs of the first repeater 805. For example, the second communication node 802 may identify information on the PSCs of the first repeater 705 by performing a signaling procedure with the first repeater 805 and the first communication node 801 based on at least part of the operations according to the second exemplary embodiment of the signal transmission and reception method described with reference to FIG. 7. Meanwhile, when the second communication node 802 has or knows information on the PSCs of the first repeater 805, the search procedure according to step S810 may not be performed. Alternatively, when the first repeater 805 is capable of providing information on the PSCs to the second communication node 802, the second communication node 8020 may receive the information on the PSCs from the first repeater 805 instead of performing the operations according to the second exemplary embodiment of the signal transmission and reception method described with reference to FIG. 7.

The second communication node 802 may determine one or more beam combinations based on information on transmission beams of the second communication node, information on the PSCs of the first repeater, information on reception beams of the first communication node, and the like (S810). Here, each of the one or more beam combinations may be composed of a combination of one or more transmission beams of the second communication node 802, one or more PSCs of the first repeater, and one or more reception beams of the first communication node. For example, one or more beam combinations may be configured identically or similarly to Table 8.

TABLE 8

| Beam combination index (5 bits) | Transmission beam of second communication node | Phase shift configuration of first repeater | Reception beam of first communication node | Change indicator |
|---|---|---|---|---|
| 1 (00000) | Beam #2-2-a | PSC #1 | Beam #1-1 | 0 |
| 2 (00001) | Beam #2-2-a | PSC #1 | Beam #1-2 | 0 |
| 3 (00010) | Beam #2-2-a | PSC #1 | Beam #1-3 | 0 |
| . . . | . . . | . . . | . . . | . . . |
| 7 (00110) | Beam #2-2-c | PSC #1 | Beam #1-1 | 0 |
| 8 (00111) | Beam #2-2-c | PSC #1 | Beam #1-2 | 0 |
| 9 (01000) | Beam #2-2-c | PSC #1 | Beam #1-3 | 1 |
| . . . | . . . | . . . | . . . | . . . |
| 26 (11001) | Beam #2-2-c | PSC #3 | Beam #1-2 | 0 |
| 27 (11010) | Beam #2-2-c | PSC #3 | Beam #1-3 | 0 |

Table 8 shows an exemplary embodiment in which 27 beam combinations are determined based on three beams (beam #2-2-a, beam #2-2-b, beam #2-2-c) corresponding to the first repeater 805 at the second communication node 802, three PSCs (PSC #1, PSC #2, PSC #3) of the first repeater 805, three beams (beam #1-1, beam #1-2, and beam #1-3) corresponding to the first repeater 805 at the first communication 801. However, this is merely an example for convenience of description, and the third exemplary embodiment of the signal transmission and reception method in the communication system is not limited thereto. Here, the three beams (beam #2-2-a, beam #2-2-b, beam #2-2-c) corresponding to the first repeater 805 at the second communication node 802 may correspond to the beam #2-2 corresponding to the first repeater in the exemplary embodiment described with reference to FIG. 6. That is, one of the beam #2-2-a, beam #2-2-b, and beam #2-2-c may be the beam #2-2. Alternatively, the beam #2-2-a, beam #2-2-b, and beam #2-2-c, which are relatively narrow beams, may be included in the beam #2-2, which is a relatively wide beam. In other words, the beam #2-2 corresponding to the first repeater may be divided into relatively narrow beams such as the beam #2-2-a, beam #2-2-b, and beam #2-2-c through beamforming.

The second communication node 802 may transmit information on the beam combination(s) determined in step S810 to the first repeater 805 (S820). The first repeater 805 may receive the information on the beam combination(s) from the second communication node 802 (S820). The first repeater 805 may transmit information on the beam combination(s) received in step S820 to the first communication node 801 (S825).

The first communication node 801 may receive the information on the beam combination(s) from the first repeater 805 (S825). The first communication node 801 may identify the information on the beam combination(s) (S830). The first communication node 801, the second communication node 802, and the first repeater 805 may perform a procedure for measuring reception strengths through mutual beam transmission and reception using one or more beam combinations (S840). For example, the second communication node 802 may transmit transmission beams for the respective beam combination indexes i (1, 2, . . . , 27) to the first repeater 805 based on the same or similar information on beam combinations as shown in Table 8. The first repeater 805 may transmit beams received from the second communication node 802 to the first communication node 801 while maintaining or changing PSCs at the same or different time points shown in Table 8. To this end, the second communication node 802 may transmit a change indicator to the first repeater 805 one or more times through a transmission beam or a separate wireless signal for measuring reception strength. Alternatively, the first repeater 805 may obtain information on the change indicator corresponding to each beam combination index i (1, 2, . . . , 27) based on the information on the beam combination(s) received in step S820. The first communication node 801 may perform measurement on the beams received from the first repeater 805 for the respective beam combination indexes i (1, 2, . . . , 27). The first communication node 801 may perform an operation of measuring a reception strength (e.g., RSRP) value of each beam received from the first repeater 805 for each beam combination index i (1, 2, . . . , 27).

In step S840, the first communication node 801 may obtain reception strength values for the respective beam combination indexes i (1, 2, . . . , 27). The first communication node 801 may transmit information on measurement results (i.e. reception strength values for the respective beam combination indexes) obtained in step S840 to the first repeater 805 (S850). The first repeater 805 may transmit the information received from the first communication node 801 in step S850 (i.e. information on the measurement results according to step S840) to the second communication node 902 (S855). The information on the measurement results that the second communication node 802 receives from the first communication node 801 through the first repeater 805 in step S855 may include at least some of information shown in Table 9.

TABLE 9

| Beam combination index (5 bits) | Reception strength |
|---|---|
| 1 (00000) | RSRP_79 |
| 2 (00001) | RSRP_107 |
| 3 (00010) | RSRP_62 |
| . . . | . . . |
| 26 (11001) | RSRP_98 |
| 27 (11010) | RSRP_88 |

The second communication node 802 may determine a priority for each beam combination based on the information on the measurement results received in step S830 (S860). That is, the second communication node 802 may determine the priority for each beam combination based on the reception strength measurement results for the respective beam combinations received from the first communication node 801. For example, when the information on the measurement results is given as in Table 9, the priority for each beam combination may be determined in the same or similar manner as Table 10.

TABLE 10

| Beam combination index (5 bits) | Priority |
|---|---|
| 1 (00000) | 10 |
| 2 (00001) | 1 (selected) |
| 3 (00010) | 16 |
| . . . | . . . |
| 26 (11001) | 3 |
| 27 (11010) | 5 |

Table 10 shows an exemplary embodiment in which the reception strength value is an RSRP value. However, this is merely an example for convenience of description, and the third exemplary embodiment of the signal transmission and reception method in the communication system is not limited thereto. Referring to Table 10, the second communication node 802 may determine the priority for each beam combination index based on the reception strength values corresponding to the respective beam combination indexes in the measurement results expressed as shown in Table 9. The second communication node 802 may select one or more indexes based on the determined priorities. Table 10 shows an exemplary embodiment in which the second communication node 802 selects the beam combination index 2, but this is merely an example for convenience of description, and the third exemplary embodiment of the signal transmission and reception method is not limited thereto. In an exemplary embodiment of the communication system, the first communication node 801, the second communication node 802, and the first repeater 805 may communicate with each other based on the priorities determined in step S860. For example, the second communication node 802 may transmit a beam to the first repeater 805 through the transmission beam #2-2-a corresponding to the beam combination index 2. The first repeater 805 may transmit the beam received from the second communication node 802 to the first communication node 801 by applying the PSC #1 corresponding to the beam combination index 2 in step S870. The first communication node 801 may receive the beam from the first repeater 805 using the reception beam #1-2 corresponding to the beam combination index 2 in step S870.

Table 10 shows an exemplary embodiment in which the second communication node selects only one beam combination index among the beam combination indexes. However, this is merely an example for convenience of description, and the third exemplary embodiment of the signal transmission and reception method in the communication system is not limited thereto. For example, the second communication node may operate to select one beam combination index or a plurality of beam combination indexes among the beam combination indexes.

Figure 9:
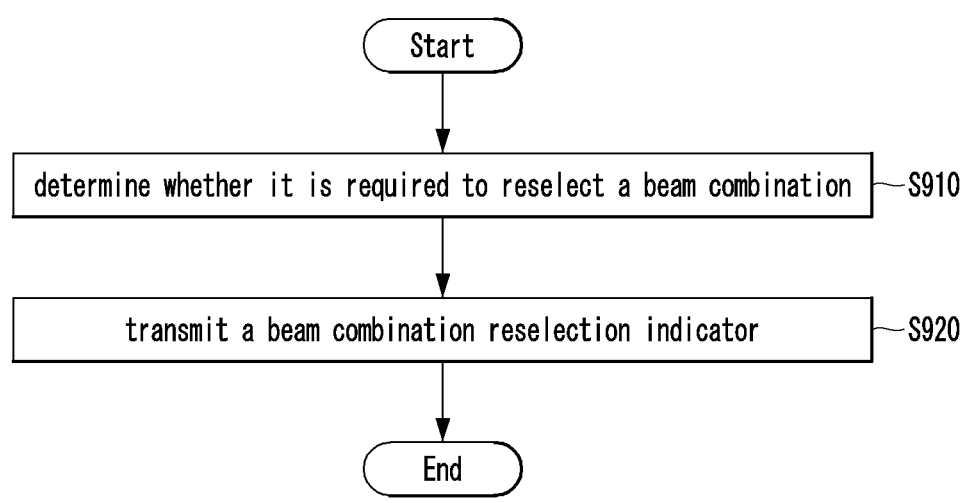
FIG. 9 is a sequence chart for describing various exemplary embodiments of a signal transmission and reception method in a communication system.

FIG. 9 is a sequence chart for describing a fourth exemplary embodiment of a signal transmission and reception method in a communication system.

As shown in FIG. 9, the communication system may support repeater-based communication. The communication system may be configured identically or similarly to the communication system 600 described with reference to FIG. 6. In the fourth exemplary embodiment of the signal transmission and reception method in the communication system, operations for determining whether or not the beam adjustment procedure described with reference to FIG. 8 needs to be re-performed. Hereinafter, in describing the fourth exemplary embodiment of the signal transmission and reception method in the communication system with reference to FIG. 9, description that is redundant with those described with reference to FIGS. 1 to 8 may be omitted.

The first communication node may determine whether the beam adjustment procedure needs to be re-performed (i.e. whether reselection of beam combination(s) is required) (S910). The first communication node may identify transmission and reception results for one or more currently selected beam combinations, and compare the identified transmission and reception results with a first threshold. For example, the first communication node may measure a reception strength (e.g. RSRP) value for each of the one or more currently selected beam combinations. If the measured reception strength value is greater than or equal to the first threshold, the first communication node may determine that reselection of beam combination(s) is not required. On the other hand, if the measured reception strength value is less than the first threshold, the first communication node may determine that reselection of beam combination(s) is required. The first communication node may transmit a beam combination reselection indicator based on the result of determination in step S910 (S920). In step S920, the first communication node may generate a beam combination reselection indicator indicating the result of determination in step S910. The beam combination reselection indicator may indicate whether a beam combination reselection procedure is required. The beam combination reselection procedure may mean that at least some of the operations described with reference to FIG. 8 (e.g. operations for a beam adjustment procedure through beam combination selection) are performed again. The first repeater may receive the beam combination reselection indicator transmitted by the first communication node in step S920. The first repeater may transmit the beam combination reselection indicator received from the first communication node to the second communication node.

When the beam combination reselection indicator indicates that a beam combination reselection procedure is required, the second communication node may trigger the beam combination reselection procedure. On the other hand, when the beam combination reselection indicator does not indicate that a beam combination reselection procedure is required, wireless communication may be performed based on the one or more currently selected beam combinations. In an exemplary embodiment of the communication system, the beam combination reselection indicator may be config-
ured identically or similarly to Table 11.

TABLE 11

| Beam combination reselection indicator | Indication information |
|---|---|
| 1 | Reselection of beam combination(s) is required |
| 0 | Reselection of beam combination(s) is not required |

Table 11 is merely an example for convenience of descrip-
tion, and exemplary embodiments of the communication
system are not limited thereto. For example, in another
exemplary embodiment of the communication system, the
beam combination reselection indicator set to 0 may mean
that a beam combination reselection procedure is required,
and the beam combination reselection indicator set to 1 may
mean that a beam combination reselection procedure is not
required. The beam combination reselection indicator may
also be referred to as a readjustment indicator. The beam
combination reselection indicator may be transmitted
through uplink control information (UCI) or downlink con-
trol information (DCI), or may be transmitted through RRC
signaling such as UE Information Response and UE Assis-
tance Information. Alternatively, new RRC signaling may be
defined for transmission of the beam combination reselec-
tion indicator. For example, the beam combination reselec-
tion indicator may indicate whether to reselect beam com-
bination(s) in the following manner.

"Enumerated {True, False}, Enumerated {Needed, Not
Needed}"

Meanwhile, if the transmission and reception results still
do not satisfy the condition of the first threshold even after
the beam combination reselection procedure is performed a
first number of times (i.e. when the reception strength is less
than the first threshold), for a smooth beamforming process,
the first threshold may be decreased by a certain amount
(e.g. 3 dB), and the operation according to step S910 may be
performed again. This process may be configured through
RRC signaling such as RRC measurement configuration,
MeasConfig of RRC reconfiguration, or the like.

Figure 10:
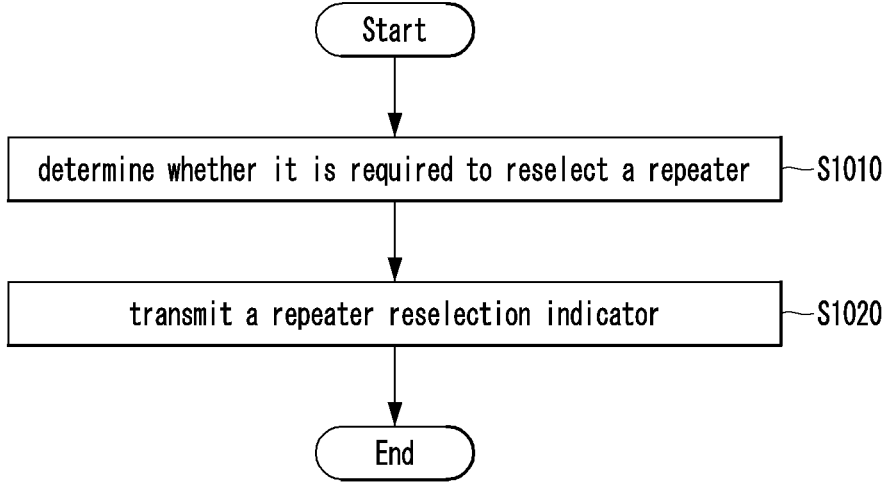
FIG. 10 is a sequence chart for describing various exemplary embodiments of a signal transmission and reception method in a communication system.

Meanwhile, if the transmission and reception results still
do not satisfy the condition of the first threshold even after
the beam combination reselection procedure is performed a
second number of times, the first communication node may
determine that the beam combination reselection procedure
according to step S910 is not required and a repeater
reselection procedure to be described with reference to FIG.
10 is required. In the instant case, the first communication
node may perform a repeater reselection procedure to be
described with reference to FIG. 10.

FIG. 10 is a sequence chart for describing a fifth exem-
plary embodiment of a signal transmission and reception
method in a communication system.

As shown in FIG. 10, the communication system may
support repeater-based communication. The communication
system may be configured identically or similarly to the
communication system 600 described with reference to FIG.
6. In the fifth exemplary embodiment of the signal trans-
mission and reception method in the communication system,
operations for determining whether a repeater selection
procedure described with reference to FIG. 6 needs to be
re-performed (i.e. whether a repeater reselection procedure
is required) may be performed. Hereinafter, in describing the
fifth exemplary embodiment of the signal transmission and
reception method in the communication system with reference to FIG. 10, description that is redundant with those
described with reference to FIGS. 1 to 9 may be omitted.

The first communication node may determine whether a
repeater reselection procedure is required (S1010). If the
transmission and reception results do not satisfy the condi-
tion of the first threshold even after the beam combination
reselection procedure described with reference to FIG. 9 is
performed a second number of times, the first communica-
tion node may determine that reselection of the repeater is
required. In other cases (e.g., if the transmission/reception
result satisfies the condition of the first threshold at or before
a time when the beam combination reselection procedure is
performed the second number of times), it may be deter-
mined that reselection of the repeater is not required. The
first communication node may transmit a repeater reselec-
tion indicator based on the result of determination in step
S1010 (S1020). In step S1020, the first communication node
may generate a repeater reselection indicator indicating the
result of determination in step S1010. The repeater reselec-
tion indicator may indicate whether a repeater reselection
procedure is required. The repeater reselection procedure
may mean that at least some of the operations described with
reference to FIGS. 6 to 8 are performed again. The first
repeater may receive the repeater reselection indicator trans-
mitted by the first communication node in step S1020. The
first repeater may transmit the repeater reselection indicator
received from the first communication node to the second
communication node.

When the repeater reselection indicator indicates that a
repeater reselection procedure is required, the second com-
munication node may trigger the repeater reselection pro-
cedure. On the other hand, when the repeater reselection
indicator does not indicate that a repeater reselection pro-
cedure is required, wireless communication may be per-
formed based on the currently selected repeater. In an
exemplary embodiment of the communication system, the
repeater reselection indicator may be configured identically
or similarly to Table 12.

TABLE 12

| Repeater reselection indicator | Indication information |
|---|---|
| 1 | Reselection of a repeater is required |
| 0 | Reselection of a repeater is not required |

Table 12 is merely an example for convenience of descrip-
tion, and exemplary embodiments of the communication
system are not limited thereto. For example, in another
exemplary embodiment of the communication system, the
repeater reselection indicator set to 0 may mean that a
repeater reselection procedure is required, and the repeater
reselection indicator set to 1 may mean that a repeater
reselection procedure is not required. The repeater reselec-
tion indicator may also be referred to as a readjustment
indicator. The repeater reselection indicator may be trans-
mitted through uplink control information (UCI) or down-
link control information (UCI), or may be transmitted
through RRC signaling such as UE Information Response
and UE Assistance Information. Alternatively, new RRC
signaling may be defined for transmission of the repeater
reselection indicator. For example, the repeater reselection
indicator may indicate whether to reselect a repeater in the
following manner.

"Enumerated {True, False}, Enumerated {Needed, Not Needed}"

Meanwhile, if the transmission and reception results still do not satisfy the conditions of the first threshold even after the repeater reselection procedure is performed, for a smooth beamforming process, the first threshold may be decreased by a certain amount (e.g. 3 dB), and a process such as performing the operation according to step S1010 may be performed.

The first threshold, condition of the first threshold, or processes related to the first threshold may be configured through RRC signaling such as RRC measurement configuration, MeasConfig of RRC reconfiguration, or the like.

Figure 11:
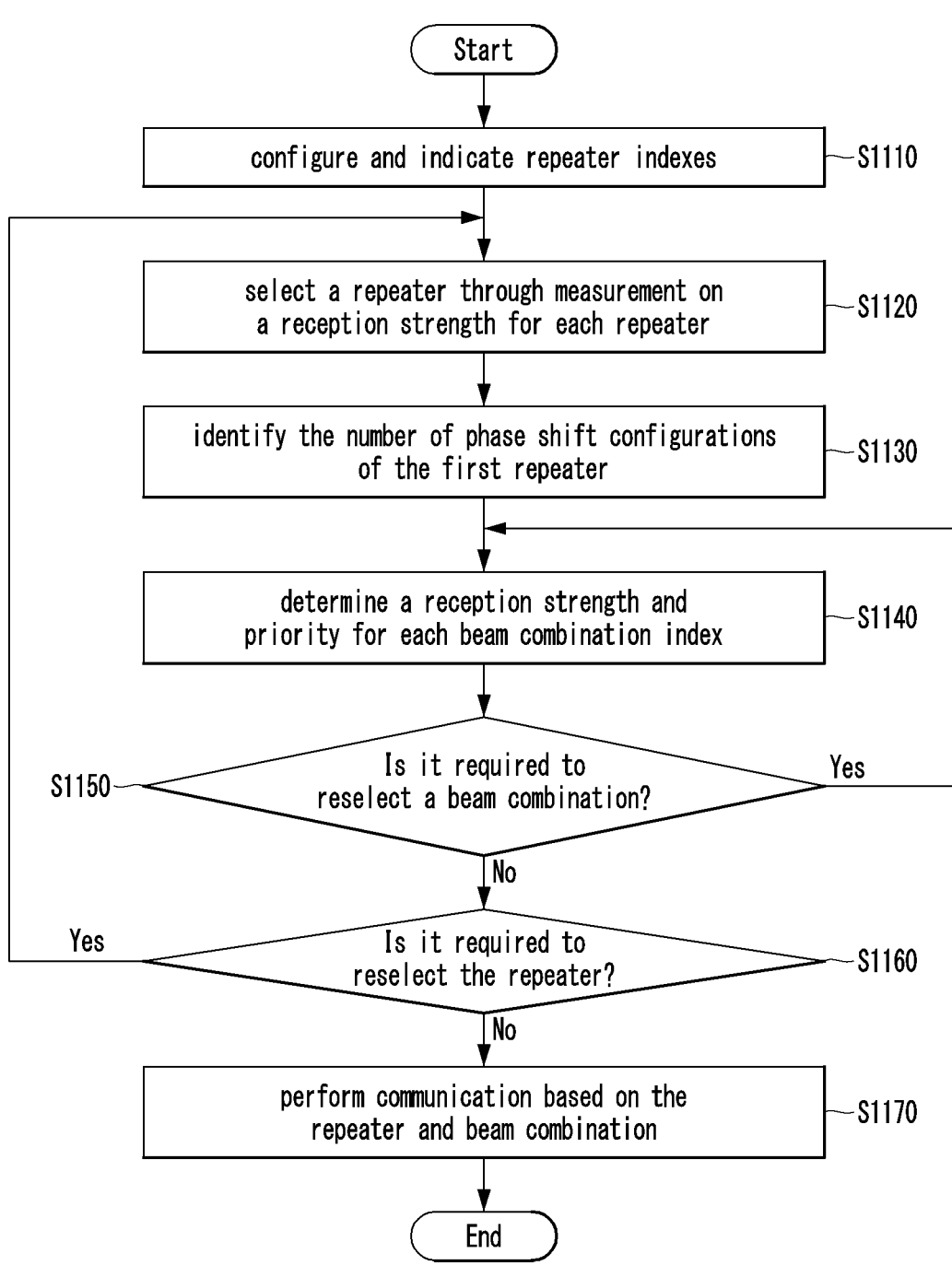
FIG. 11 is a flowchart for describing various exemplary embodiments of a signal transmission and reception method in a communication system.

FIG. 11 is a flowchart for describing a sixth exemplary embodiment of a signal transmission and reception method in a communication system.

As shown in FIG. 11, the communication system may support repeater-based communication. The communication system may be configured identically or similarly to the communication system 600 described with reference to FIG. 6. In the sixth exemplary embodiment of the signal transmission and reception method in the communication system, operations for communication nodes to efficiently perform repeater-based communication may be performed. Hereinafter, in describing the sixth exemplary embodiment of the signal transmission and reception method in the communication system with reference to FIG. 11, description that is redundant with those described with reference to FIGS. 1 to 10 may be omitted.

In an exemplary embodiment of the communication system, communication nodes of the communication system may perform a repeater index configuration and indication procedure (S1110). The communication nodes may perform a procedure to select a repeater by measuring a reception strength of each repeater (S1120). In step S1110 and/or step S1120, the communication nodes may perform operations that are the same as or similar to at least some of the operations constituting the first exemplary embodiment of the signal transmission and reception method in the communication system described with reference to FIG. 6. Through step S1120, a first repeater to relay communication between the first communication node and the second communication node may be selected.

In an exemplary embodiment of the communication system, the communication nodes may perform a procedure to identify (or estimate) the number of PSCs of the first repeater selected in step S1120 (S1130). In step S1130, the communication nodes may perform operations identical or similar to at least some of the operations constituting the second exemplary embodiment of the signal transmission and reception method in the communication system described with reference to FIG. 7.

In an exemplary embodiment of the communication system, the communication nodes may perform operations to determine (i.e. identify and determine) a reception strength and priority for each beam combination index with respect to one or more beam combinations configured based on information on the PSCs of the first repeater identified in step S1130 (S1140). In step S1140, the communication nodes may perform operations that are the same as or similar to at least some of the operations constituting the third exemplary embodiment of the signal transmission and reception method in the communication system described with reference to FIG. 8. In step S1140, one or more beam combinations may be selected.

In an exemplary embodiment of the communication system, the communication nodes may perform operations to determine whether a beam combination reselection procedure is required (S1150). In step S1150, the communication nodes may perform operations that are the same as or similar to at least some of the operations constituting the fourth exemplary embodiment of the signal transmission and reception method in the communication system described with reference to FIG. 9. When it is determined that a beam combination reselection procedure is required in step S1150, at least some of the operations according to step S1140 may be performed again. When it is determined that a beam combination reselection procedure is not required, the operation according to step S1160 may be performed.

In an exemplary embodiment of the communication system, the communication nodes may perform operations to determine whether a repeater reselection procedure is required (S1160). In step S1160, the communication nodes may perform operations that are the same as or similar to at least some of the operations constituting the fifth exemplary embodiment of the signal transmission and reception method in the communication system described with reference to FIG. 10. When it is determined that a beam combination reselection procedure is required in step S1160, at least some of the operations according to steps S1120 to S1150 may be performed again. When it is determined that a repeater reselection procedure is not required, the communication nodes may perform communication based on the repeater and one or more beam combinations selected through steps S1110 to S1160 (S1170).

According to exemplary embodiments of a repeater-based beam control method and apparatus in a communication system, the most suitable repeater for relaying communication between specific communication nodes can be easily selected from among one or more repeaters existing in the communication system. Information on one or more phase shift configurations of the selected repeater can be easily identified based on signaling procedures between the communication nodes. Based on this information, one or more beam combinations can be determined using information on beams of each communication node and the phase shift configurations of the selected repeater. The beam combination(s) identified as the best among the determined beam combinations can then be utilized for repeater-based communication. Consequently, the performance of repeater-based beam transmission and reception can be improved.

However, the effects that the exemplary embodiments of the repeater-based beam control methods and apparatuses can achieve in the communication system are not limited to those mentioned above. Other effects not mentioned are expected to be clearly understood by those skilled in the art in the technical field to which the present disclosure belongs, based on the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments of the present disclosure, a programmable logic device such as a field-programmable gate array may be used to perform some or all of functions of the methods described herein. In some exemplary embodiments of the present disclosure, the field-programmable gate array may be operated with a microprocessor to perform one of the methods described herein. In general, the methods are preferably performed by a certain hardware device.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operation method of a first communication node, the operation method comprising:

transmitting, to a second communication node, a first indication including information on repeaters;

transmitting, to the second communication node and through the repeaters, a first signal group including first signals respectively corresponding to the repeaters;

receiving, from the second communication node, a first response including a measurement result for each of the first signals included in the first signal group;

in response to the first response, determining a first repeater to use for communication with the second communication node among the repeaters;

performing a search signaling procedure for searching for information on one or more phase shift configurations of the first repeater;

determining beam combination information for one or more beam combinations between the first communication node, the first repeater, and the second communication node; and in response to the beam combination information, performing wireless communication with the first repeater and the second communication node.

2. The operation method of claim 1, wherein the first indication includes at least one of information on one or more indexes corresponding to the repeaters, or information on one or more transmission beams of the first communication node corresponding to the repeaters.

3. The operation method of claim 1, wherein the measurement results included in the first response include information on one or more reception strength values for the first signals received by the second communication node through the repeaters, and the determining of the first repeater comprises:

identifying a best first reception strength value among the one or more reception strength values; and determining the first repeater corresponding to the first reception strength value to use for communication with the second communication node.

4. The operation method of claim 1, wherein the performing of the search signaling procedure comprises:

transmitting, to the first repeater, a first change indicator indicating to change a phase shift configuration;

transmitting a second signal to the first repeater;

receiving, from the first repeater, a second response for the second signal transmitted from the second communication node; and determining whether an additional search is required for information on phase shift configurations, wherein the second response includes information on a result of receiving the second signal at the second communication node, the second signal being phase-shifted by the first repeater based on one of the one or more phase shift configurations.

5. The operation method of claim 4, further comprising: after the performing of the search signaling procedure, in response that the additional search is determined to be required, re-performing the search signaling procedure.

6. The operation method of claim 4, further comprising: after the performing of the search signaling procedure, in response that the additional search is determined not be required, transmitting a first search stop indicator to the first repeater indicating that the search signaling procedure is stopped.

7. The operation method of claim 1, wherein the beam combination information is determined through a combination of at least part of information on one or more transmission beams of the first communication node, information on the one or more phase shift configurations of the first repeater, information on one or more reception beams of the second communication node, or information on one or more beam combination indexes.

8. The operation method of claim 1, wherein the performing of the wireless communication comprises:

transmitting the beam combination information to the second communication node through the first repeater;

transmitting, to the second communication node through the first repeater, one or more beams corresponding to each of the one or more beam combinations;

receiving, from the second communication node, information on a measurement result for each of the one or more beams; and based on the measurement results for the one or more beams, determining a priority of each of the one or more beam combinations.

9. The operation method of claim 8, wherein the performing of the wireless communication further comprises:

after the determining of the priority, selecting at least one beam combination among the one or more beam combinations based on the determined priorities; and receiving, from the second communication node, a beam combination reselection indicator indicating whether a beam combination reselection procedure for reselecting at least one beam combination is required, wherein in response that the beam combination reselection indicator indicates that the beam combination reselection procedure is required, the beam combination reselection procedure is triggered.

10. The operation method of claim 1, wherein the performing of the wireless communication comprises: receiving, from the second communication node, a repeater reselection indicator indicating whether a repeater reselection procedure for reselecting a repeater to use for communication with the second communication node is required, wherein in response that the repeater reselection indicator indicates that the repeater reselection procedure is required, the repeater reselection procedure is triggered.

11. An operation method of a first communication node, the operation method comprising:

receiving, from a second communication node, a first indication including information on repeaters;

receiving, from the second communication node and through the repeaters, a first signal group including first signals respectively corresponding to the repeaters;

transmitting, to the second communication node, a first response including a measurement result for each of the first signals included in the first signal group;

performing a search signaling procedure for searching for information on one or more phase shift configurations of the first repeater;

receiving, from the second communication node, beam combination information on one or more beam combinations between the first communication node, the first repeater, and the second communication node; and in response to the beam combination information, performing wireless communication with the first repeater and the second communication node, wherein the first repeater is a repeater that the second communication node determines to use for communication between the first and second communication nodes among the repeaters based on the first response.

12. The operation method of claim 11, wherein the measurement results included in the first response include information on one or more reception strength values for the first signals received by the second communication node through the repeaters, and the first repeater corresponds to a first reception strength value which is a best reception strength value among the one or more reception strength values.

13. The operation method of claim 11, wherein the performing of the search signaling procedure comprises:

receiving a second signal from the first repeater, the second signal being transmitted from the second communication node and phase-shifted by the first repeater based one of the one or more phase shift configurations; and transmitting, to the second communication node and through the first repeater, a second response including information on a reception result of the phase-shifted second signal.

14. The operation method of claim 11, wherein the beam combination information is determined through a combination of at least part of information on one or more transmission beams of the second communication node, information on the one or more phase shift configurations of the first repeater, information on one or more reception beams of the first communication node, or information on one or more beam combination indexes.

15. The operation method of claim 11, wherein the performing of the wireless communication comprises:

receiving, from the second communication node through the first repeater, one or more beams corresponding to each of the one or more beam combinations; and transmitting, to the second communication node, information on a measurement result for each of the one or more beams, wherein a priority of each of the one or more beam combinations is determined based on the measurement results for the one or more beams, and at least one beam combination is selected from among the one or more beam combinations based on the priorities.

16. The operation method of claim 15, wherein the performing of the wireless communication comprises: after the transmitting of the information on a measurement result for each of the one or more beams, transmitting, to the second communication node, a beam combination reselection indicator indicating whether a beam combination reselection procedure for reselecting at least one beam combination is required, wherein in response that the beam combination reselection indicator indicates that the beam combination reselection procedure is required, the beam combination reselection procedure is triggered.

17. The operation method of claim 11, wherein the performing of the wireless communication comprises: transmitting, to the second communication node, a repeater reselection indicator indicating whether a repeater reselection procedure for reselecting a repeater to use for communication between the first and second communication nodes is required, wherein in response that the repeater reselection indicator indicates that the repeater reselection procedure is required, the repeater reselection procedure is triggered.

18. A first communication node comprising:

a processor, wherein the processor causes the first communication node to perform:

transmitting, to a second communication node, a first indication including information on repeaters;

transmitting, to the second communication node and through the repeaters, a first signal group including first signals respectively corresponding to the repeaters;

receiving, from the second communication node, a first response including a measurement result for each of the first signals included in the first signal group;

in response to the first response, determining a first repeater to use for communication with the second communication node among the repeaters;

performing a search signaling procedure for searching for information on one or more phase shift configurations of the first repeater;

determining beam combination information for one or more beam combinations between the first communication node, the first repeater, and the second communication node; and in response to the beam combination information, performing wireless communication with the first repeater and the second communication node.

19. The first communication node of claim 18, wherein in the performing of the search signaling procedure, the processor further causes the first communication node to perform:

transmitting, to the first repeater, a first change indicator indicating to change a phase shift configuration;

transmitting a second signal to the first repeater;

receiving, from the first repeater, a second response for the second signal transmitted from the second communication node; and determining whether an additional search is required for information on phase shift configurations, wherein the second response includes information on a result of receiving the second signal at the second communication node, the second signal being phase-shifted by the first repeater based on one of the one or more phase shift configurations.

20. The first communication node of claim 18, wherein in the performing of the wireless communication, the processor further causes the first communication node to perform:

transmitting the beam combination information to the second communication node through the first repeater;

transmitting, to the second communication node through the first repeater, one or more beams corresponding to each of the one or more beam combinations;

receiving, from the second communication node, information on a measurement result for each of the one or more beams; and based on the measurement results for the one or more beams, determining a priority of each of the one or more beam combinations.

* * * * *